United States Patent
Su et al.

(10) Patent No.: US 11,437,625 B2
(45) Date of Patent: Sep. 6, 2022

(54) LITHIUM BATTERY ANODE CONTAINING SILICON NANOWIRES FORMED IN SITU IN PORES OF GRAPHENE FOAM

(71) Applicant: Nanotek Instruments, Inc., Dayton, OH (US)

(72) Inventors: Yu-Sheng Su, Dayton, OH (US); Jun Yin, Miamisburg, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 99 days.

(21) Appl. No.: 15/975,181

(22) Filed: May 9, 2018

(65) Prior Publication Data

US 2018/0261847 A1    Sep. 13, 2018

Related U.S. Application Data

(62) Division of application No. 15/287,078, filed on Oct. 6, 2016, now Pat. No. 9,997,784.

(51) Int. Cl.
*H01M 4/13* (2010.01)
*H01M 4/62* (2006.01)
(Continued)

(52) U.S. Cl.
CPC ......... *H01M 4/625* (2013.01); *H01M 4/0471* (2013.01); *H01M 4/133* (2013.01);
(Continued)

(58) Field of Classification Search
CPC .... H01M 4/625; H01M 4/0471; H01M 4/133; H01M 4/134; H01M 4/1393; H01M 4/1395; H01M 4/386; H01M 4/661; H01M 4/0416; H01M 4/0428; H01M 10/052; H01M 10/0525; H01M 2004/021; H01M 2004/027
See application file for complete search history.

(56) References Cited

U.S. PATENT DOCUMENTS

| | | |
|---|---|---|
| 7,071,258 B1 | 7/2006 | Jang et al. |
| 7,745,047 B2 | 6/2010 | Zhamu et al. |

(Continued)

OTHER PUBLICATIONS

Lu et al., "In situ growth of Si nanowires on graphene sheets for Li-ion storage", Electrochemical Acta, vol. 74, 2012, pp. 176-181.*

(Continued)

*Primary Examiner* — Raymond Alejandro

(57) ABSTRACT

An anode for a lithium battery comprises a graphene foam structure composed of multiple pores and pore walls and Si nanowires residing in the pores. The Si nanowires are formed in situ inside the pores. The pore walls comprise a 3D network of interconnected graphene planes or stacked graphene planes having an inter-plane spacing $d_{002}$ from 0.3354 nm to 0.40 nm as measured by X-ray diffraction. The Si nanowires have a diameter from 2 nm to 100 nm and a length-to-diameter aspect ratio of at least 5 and the Si nanowires are in an amount from 0.5% to 99% by weight based on the total weight of the graphene foam and the Si nanowires combined.

20 Claims, 17 Drawing Sheets

(51) Int. Cl.

| | | |
|---|---|---|
| *H01M 4/04* | (2006.01) | |
| *H01M 4/133* | (2010.01) | |
| *H01M 4/134* | (2010.01) | |
| *H01M 4/1395* | (2010.01) | |
| *H01M 4/38* | (2006.01) | |
| *H01M 4/66* | (2006.01) | |
| *H01M 4/1393* | (2010.01) | |
| *H01M 4/02* | (2006.01) | |
| *H01M 10/0525* | (2010.01) | |
| *H01M 10/052* | (2010.01) | |

(52) U.S. Cl.
CPC ......... *H01M 4/134* (2013.01); *H01M 4/1393* (2013.01); *H01M 4/1395* (2013.01); *H01M 4/386* (2013.01); *H01M 4/661* (2013.01); *H01M 4/0416* (2013.01); *H01M 4/0428* (2013.01); *H01M 10/052* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 9,601,754 B2 * | 3/2017 | Cho | ............... H01M 4/1391 |
| 2005/0136330 A1 | 6/2005 | Mao et al. | |
| 2005/0271574 A1 | 12/2005 | Jang et al. | |
| 2008/0048152 A1 | 2/2008 | Jang et al. | |
| 2009/0305135 A1 | 12/2009 | Shi et al. | |
| 2010/0143798 A1 | 6/2010 | Zhamu et al. | |
| 2016/0043384 A1 * | 2/2016 | Zhamu | ............... H01M 4/133 429/231.4 |
| 2017/0104204 A1 * | 4/2017 | Zhamu | ............... H01M 4/139 |

OTHER PUBLICATIONS

Chen et al., "Three-dimensional Flexible and Conductive Interconnected Graphene Networks Grown by Chemical Vapor Deposition" Nature Materials (2011) vol. 10, pp. 424-428.

Choi et al., "3D Macroporous Graphene Frameworks for Supercapacitors with High Energy and Power Densities" ACS Nano (2012) vol. 6, pp. 4020-4028.

Karlicky et al., "Halogenated Graphenes: Rapidly Growing Family of Graphene Derivatives" ACS Nano (2013) vol. 7, No. 8, pp. 6434-6464.

Wang et al., "Self-Assembled TiO2-Graphene Hybrid Nanostructures for Enhanced Li-Ion Insertion" ACS Nano (2009) vol. 3, No. 4, pp. 907-914.

Xu et al., "Self-Assembled Graphene Hydrogel via a One-Step Hydrothermal Process" ACS Nano (2010) vol. 4, No. 7, pp. 4324-4330.

\* cited by examiner

LITHIUM BATTERY ANODE CONTAINING SILICON NANOWIRES FORMED IN SITU IN PORES OF GRAPHENE FOAM

CROSS REFERENCE TO RELATED APPLICATIONS

The present application is a divisional of U.S. patent application Ser. No. 15/287,078 filed Oct. 6, 2016 (now U.S. Pat. No. 9,997,784 issued Jun. 12, 2018), which is hereby incorporated by reference.

FIELD OF THE INVENTION

The present invention relates generally to the field of rechargeable lithium-ion battery and, more particularly, to an anode electrode containing silicon nanowires, as an anode active material, embedded in and protected by a layer of graphene foam and the process for producing same.

BACKGROUND OF THE INVENTION

The discussion of prior art information is herein divided into three parts in this Background section: (a) a discussion on high-capacity anode active materials for lithium-ion batteries and long-standing issues associated with these materials; (b) the 2-D nanomaterial called "graphene" and its prior use as a conductive additive material for the anode active material; and (c) graphene-based foamed material called "graphene foam".

A unit cell or building block of a lithium-ion battery is typically composed of an anode active material layer, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil).

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 1(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. This degradation phenomenon is illustrated in FIG. 1(A). These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 µm to 200 µm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of anode active particles are Si, Sn, and $SnO_2$. Unfortunately, when an active material particle, such as Si particle, expands (e.g. up to a volume expansion >300%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such an anode in a cost-effective manner.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an intergraphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or graphene oxide sheets/platelets (collectively, NGPs) are a new class of carbon nanomaterial (a 2-D nanocarbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A.

Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

In one process, graphene materials are obtained by intercalating natural graphite particles with a strong acid and/or an oxidizing agent to obtain a graphite intercalation compound (GIC) or graphite oxide (GO), as illustrated in FIG. 2 (a process flow chart). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 2) in a mixture of sulfuric acid, nitric acid (an oxidizing agent), and another oxidizing agent (e.g. potassium permanganate or sodium perchlorate). The resulting GIC (22) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range from typically 800-1,050° C. for approximately 30 seconds to 2 minutes, the GIC undergoes a rapid volume expansion by a factor of 30-300 to form "graphite worms" (24), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (26) that typically have a thickness in the range from 0.1 mm (100 μm)-0.5 mm (500 μm). Alternatively, one may choose to use a low-intensity air mill or shearing machine to simply break up the graphite worms for the purpose of producing the so-called "expanded graphite flakes" (49) which contain mostly graphite flakes or platelets thicker than 100 nm (hence, not a nanomaterial by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33), as disclosed in our U.S. application Ser. No. 10/858,814. Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper (34) using a paper-making process.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Our research group also pioneered the application of graphene materials for battery applications: One of our earlier applications discloses a graphene-based composite composition for use as a lithium ion battery anode [A. Zhamu and B. Z. Jang, "Nano Graphene Platelet-Based Composite Anode Compositions for Lithium Ion Batteries," U.S. patent application Ser. No. 11/982,672 (Nov. 5, 2007); Now U.S. Pat. No. 7,745,047 (Jun. 29, 2010)]. This composition comprises: (a) micron- or nanometer-scaled particles or coating of an anode active material; and (b) a plurality of nanoscaled graphene platelets (NGPs), wherein a platelet comprises a graphene sheet or a stack of graphene sheets having a platelet thickness less than 100 nm and wherein the particles or coating are physically attached or chemically bonded to NGPs. Nano graphene platelets (NGPs) are individual graphene sheets (individual basal planes of carbon atoms isolated from a graphite crystal) or stacks of multiple graphene planes bonded together in the thickness direction. The NGPs have a thickness from 0.34 nm to 100 nm and a length, width, or diameter that can be greater or less than 10 μm. The thickness is more preferably less than 10 nm and most preferably less than 1 nm.

Disclosed in another patent application of ours is a more specific composition, which is composed of a 3-D network of NGPs and/or other conductive filaments and anode active material particles that are bonded to these NGPs or filaments through a conductive binder [J. Shi, A. Zhamu and B. Z. Jang, "Conductive Nanocomposite-based Electrodes for Lithium Batteries," U.S. patent application Ser. No. 12/156, 644 (Jun. 4, 2008) (U.S. Pat. Pub. No. 2009-0305135)]. Yet another application provides a nano graphene-reinforced nanocomposite solid particle composition containing NGPs and electrode active material particles, which are both dispersed in a protective matrix (e.g. a carbon matrix) [A. Zhamu, B. Z. Jang, and J. Shi, "Nano Graphene Reinforced Nanocomposite for Lithium Battery Electrodes," U.S. patent application Ser. No. 12/315,555 (Dec. 4, 2008) (U.S. Pat. Pub. No. 2010-0143798)].

After our discovery of graphene providing an outstanding support for anode active materials, many subsequent studies by others have confirmed the effectiveness of this approach. For instance, Wang, et al. investigated self-assembled $TiO_2$-graphene hybrid nanostructures for enhanced Li-ion insertion [D. Wang, et al. "Self-Assembled $TiO_2$-Graphene Hybrid Nanostructures for Enhanced Li-Ion Insertion." *ACS Nano*, 3 (2009) 907-914]. The results indicate that, as compared with the pure $TiO_2$ phase, the specific capacity of the hybrid was more than doubled at high charge rates. The improved capacity at a high charge-discharge rate was attributed to increased electrode conductivity afforded by a percolated graphene network embedded into the metal oxide electrodes. However, all these earlier studies were focused solely on providing a network of electron-conducting paths for the anode active material particles and failed to address other critical issues, such as ease of anode material processing, electrode processability, electrode tap density (the ability to pack a dense mass into a given volume), stability of solid-electrolyte interface (SEI), and long-term cycling stability. For instance, the method of preparing self-assembled hybrid nanostructures is not amenable to mass production. These are all critically important issues that must be addressed in a real battery manufacturing environment.

The present invention goes beyond and above these prior art efforts of using solid graphene sheets or platelets (NGPs) to form a 3-D conductive network to support an anode active material. Specifically, the instant application makes use of a graphene foam material to protect an anode active material (i.e., Si nanowires) by providing several other unexpected functions, in addition to forming a 3-D network of electron-conducting pathways. Hence, a brief discussion on the production of graphene foams should be helpful to the reader.

Generally speaking, a foam (or foamed material) is composed of pores (or cells) and pore walls (the solid portion of a foam material). The pores can be interconnected to form an open-cell foam. A graphene foam is composed of pores and pore walls that contain a graphene material. There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range from 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas. This method does not lend itself to embedding anode active material particles therein.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene foams has major deficiencies. Further, none of the earlier work makes use of graphene foam as a protective material for an anode active material of a lithium battery.

Thus, it is an object of the present invention to provide a cost-effective process for producing highly conductive, mechanically robust graphene foams in large quantities. This graphene foam also contains an anode active material (Si nanowires) residing in the pores of this foam and being protected by this foam. Some of these Si nanowires are chemically bonded to graphene planes that constitute foam walls. This process does not involve the use of an environmentally unfriendly chemical. This process enables flexible design and control of the porosity level and pore sizes, alleviating the volume expansion issues of the anode layer caused by Si expansion commonly associated with the high-capacity anode of a lithium-ion battery.

It is another object of the present invention to provide a process for producing graphene foam-protected Si nanowires wherein the graphene foam exhibits a thermal conductivity, electrical conductivity, elastic modulus, and/or compressive strength that is comparable to or greater than those of the graphite/carbon foams. The internal pores of the protective graphene foam expands and shrinks congruently with the expansion and shrinkage of the embedded Si nanowires, enabling long-term cycling stability of a lithium battery featuring such a high-capacity anode.

It is another object of the present invention to provide an anode electrode layer that exhibits a combination of exceptional thermal conductivity, electrical conductivity, mechanical strength, and elasticity unmatched by any anode layer commonly used in a lithium-ion battery. There is no binder (e.g. SBR or PVDF) or conductive additive (e.g. acetylene black) that are required or included in the anode electrode. The high conductivity enables the use of the graphene foam host itself as an anode current collector, obviating the need to have a separate (additional) current collector (e.g. Cu foil) and thus reducing the weight and volume of the battery. Furthermore, there is no limitation on the achievable thickness of the foam layer (e.g, greater than 500 μm or several mm), in contrast to the thickness of typically 70-200 μm for conventional lithium-ion battery anodes. These features enable the production of lithium-ion batteries having significantly higher gravimetric and volumetric energy densities.

SUMMARY OF THE INVENTION

Herein reported is a process for producing a significantly improved anode electrode (preferably in a layer form) that provides not only a robust 3-D network of electron-conducting paths and high conductivity, but also enables the anode active material (Si nanowires embedded in the pores of a graphene foam structure) to be readily made into an electrode layer with a high electrode tap density, a sufficiently large electrode thickness (typically 50-800 μm) to ensure a sufficient amount of output current, a large weight percentage of anode active material (with respect to the total amount of the non-active materials, such as conductive additive and binder, in an electrode and an optional, separate current collector combined), and long-term cycling stability. Both the reversible capacity and the first-cycle efficiency (e.g. 85%-91% vs. typically 60-80%) are also significantly improved over those of state-of-the-art Si-based anode materials.

Briefly, the present invention provides a new anode electrode composition wherein an anode active material (i.e. Si nanowires) is grown in situ and naturally lodged in pores of a graphene foam structure. Some of the Si nanowires are chemically bonded to graphene pore walls of the foam structure. Such a configuration is beyond and above just having an adequate room to accommodate expansion of the anode active material. The presently invented graphene foam also exhibits a unique "elastic" property in that the cell walls (solid graphene portion of the foam) can be compressed to tightly embrace the anode active material when an anode layer is made and Si nanowires are formed in situ inside the pores. When individual Si nanowires expand (upon Li intercalation), the volume expansion is accommodated by local cell walls, without inducing a volume change of the entire anode electrode layer (hence, not exerting internal pressure to the battery). During the subsequent discharge cycle, these Si nanowires shrink and the local cell walls shrink or snap back in a congruent manner, maintaining a good contact between cell walls and the Si nanowires (remaining capable of accepting $Li^+$ ions and electrons during the next charge/discharge cycle).

In certain embodiments of the invention, a process is provided for producing an anode or negative electrode for a lithium-ion battery, wherein the anode electrode (e.g. a layer) comprises a layer of solid graphene foam composed of multiple pores and pore walls and Si nanowires residing in the pores. These Si nanowires are directly formed in situ inside the pores and some of the Si nanowires are chemically bonded to pore walls at one of their ends. In some preferred embodiments, the process comprises:

(a) Dispersing catalyst metal-coated Si particles, graphene sheets (preferably also catalyst metal coated), and an optional blowing agent in a liquid medium to form a graphene/Si dispersion, wherein the Si particles have a particle diameter from 0.2 μm to 20 μm (preferably from 0.5 μm to 5 μm) and the catalyst metal is in a form of nanoparticles having a diameter from 0.5 nm to 100 nm or a thin coating having a thickness from 1 nm to 100 nm deposited on surfaces of the Si particles and wherein the Si particles contain pure Si having at least 99.9% by weight of Si element or a Si alloy or mixture having from 70% to 99.9% by weight of Si therein;

(b) dispensing and depositing the graphene/Si dispersion onto a surface of a supporting substrate (e.g. glass, PET film, or stainless steel sheet) to form a wet layer of graphene/Si mixture and partially or completely removing the liquid medium from the wet layer of graphene/Si mixture to form a dried layer of graphene/Si mixture material; and (c) exposing the dried layer of graphene/Si mixture to a high temperature environment, preferably including a temperature from 300° C. to 2,000° C. (more preferably from 400° C. to 1,500° C., and most preferably from 500° C. to 1,200° C.), for a period of time sufficient to induce volatile gas molecules from the graphene sheets or to activate the blowing agent for producing the graphene foam and, concurrently, to enable a catalyst metal-catalyzed growth of multiple Si nanowires emanating from Si particles as a feed material in pores of the graphene foam to form the anode electrode layer; wherein the Si nanowires have a diameter less than 100 nm and a length-to-diameter aspect ratio of at least 5 and the Si nanowires are in an amount from 0.5% to 99% by weight based on the total weight of the graphene foam and the Si nanowires combined. These Si nanowires appear to have extruded out from the starting Si particles and emanate from surfaces of these Si particles.

In certain embodiments, the graphene sheets contain a pristine graphene material having less than 0.01% by weight of non-carbon elements or a non-pristine graphene material having 0.01% to 50% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In some preferred embodiments, the surfaces of graphene sheets are also deposited with the catalyst metal. We have surprisingly observed that, as compared to the situation where only Si particle surfaces are coated with catalyst metal, larger numbers of smaller-diameter Si nanowires are formed if not only Si particles but also graphene sheet surfaces are deposited with the catalyst metal. These Si nanowires appear to have extruded out from the starting Si particles and emanate from surfaces of graphene sheets as well. The Si nanowires emanated from graphene sheet surfaces (pore wall surfaces inside graphene foam) appear to be very thin (typically <30 nm in diameter, more typically <20 nm, and some <10 nm). These Si nanowires are also chemically bonded to pore walls (graphene planes), having reduced interface resistance. We have further found that thinner Si nanowires enable faster transport of lithium ions in and out of the Si nanowires, leading to higher-rate capability (higher power density) of the lithium-ion batteries.

In the process, preferably the dispensing and depositing procedure includes subjecting the graphene/silicon dispersion to an orientation-inducing stress. This is essential to achieving graphene foam of higher structural integrity, higher elasticity, and higher conductivity.

As a preferred embodiment, some of the multiple pores are lodged with Si nanowires and other pores are Si-free, and the graphene foam is sufficiently elastic to accommodate volume expansion and shrinkage of Si nanowires during a battery charge-discharge cycle to avoid expansion of the anode layer. This helps to extend the cycle life of a lithium-ion battery.

The graphene sheets may be selected from a single-layer sheet or few-layer platelet of pristine graphene, graphene oxide, reduced graphene oxide, graphene fluoride, graphene bromide, graphene iodide, boron-doped graphene, nitrogen-doped graphene, chemically functionalized graphene, or a combination thereof, wherein few layer is defined as less than 10 layers of graphene planes.

The catalyst metal-coated Si particles may be produced by a step of depositing a catalyst metal on Si particle surfaces by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof. The catalyst metal may be selected from Cu, Ni, Co, Mn, Fe, Ti, Al, Ag, Au, Pt, Pd, or a combination thereof. It may be noted that the high temperature range required of Si nanowire growth depends on the catalytic metal used. For instance, for Cu, Ni, and/or Fe, the range is preferably from 700° C. to 1,000° C. For the catalysts containing noble metals, the reaction temperatures are preferably and typically higher.

The catalyst metal may be deposited on Si and graphene sheet surfaces by a procedure including (a) dissolving or dispersing a catalytic metal precursor in a liquid to form a precursor solution, (b) bringing the precursor solution in contact with surfaces of the graphene sheets and surfaces of Si particles, (c) removing the liquid; and (d) chemically or thermally converting the catalytic metal precursor to become catalyst metal coating or nanoparticles.

In the invented process, step (d) of chemically or thermally converting the catalytic metal precursor may be conducted concurrently with the procedure (c) of exposing the dried layer of graphene/Si mixture to a high temperature environment. The process catalytic metal precursor may be a salt or organometal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The invention also provides a process for producing an anode or negative electrode layer for a lithium battery, wherein the anode layer comprises a layer of solid graphene foam composed of multiple pores and pore walls and silicon (Si) nanowires residing in the pores. Some of the Si nanowires have one of their ends being chemically bonded to graphene-based pore walls. The process comprises: (A) dispersing Si particles, graphene sheets, a catalytic metal precursor, and an optional blowing agent in a liquid to form a graphene/Si dispersion, wherein the Si particles have a diameter from 0.2 μm to 20 μm and contain pure Si having at least 99.9% by weight of Si element or a Si alloy or mixture having from 70% to 99.9% by weight of Si therein; (B) dispensing and depositing the graphene/Si dispersion onto a surface of a supporting substrate to form a wet layer of graphene/Si mixture and partially or completely removing the liquid medium from the wet layer of graphene/Si mixture to form a dried layer of graphene/Si mixture material; and (C) exposing said dried layer of graphene/Si mixture to a high temperature environment, from 100° C. to 2,500° C., for a period of time sufficient to thermally convert the catalytic metal precursor to a coating or nanoparticles of a catalyst metal deposited on surfaces of Si particles and/or surfaces of graphene sheets, to induce volatile gas molecules from the graphene sheets or to activate the blowing agent for producing the graphene foam, and, concurrently or sequentially, to enable a catalyst metal-catalyzed growth of multiple Si nanowires emanating from the Si particles as a feed material in pores of the graphene foam to form the anode electrode layer; wherein the Si nanowires have a diameter less than 100 nm and a length-to-diameter aspect ratio of at least 5 and the Si nanowires are in an amount from 0.5% to 99% by weight based on the total weight of the graphene foam and the Si nanowires combined.

In certain embodiments, the catalytic metal precursor is a salt or organometal molecule of a transition metal selected from Cu, Ni, Co, Mn, Fe, Ti, Al, or a combination thereof.

The catalytic metal precursor may be selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

Preferably, the procedure of exposing the dried layer of graphene/Si mixture to a high temperature environment is conducted in a protective atmosphere of an inert gas, nitrogen gas, hydrogen gas, a mixture thereof, or in a vacuum.

The invented anode electrode layer comprises an anode active material (Si nanowires) embedded in pores of a solid graphene foam composed of multiple pores and pore walls, wherein (a) the pore walls contain a pristine graphene material having essentially zero % of non-carbon elements or a non-pristine graphene material having 0.001% to 5% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; (b) the Si nanowires are in an amount from 0.5% to 99% by weight based on the total weight of the graphene foam and the anode active material combined; and (c) some pores are lodged with the particles of the anode active material and other pores are particle-free, and the graphene foam is sufficiently elastic to accommodate volume expansion and shrinkage of the particles of the anode active material during a battery charge-discharge cycle to avoid an expansion of the anode layer. Preferably, the pore walls contain a 3D network of interconnected graphene planes to impart elasticity to the graphene foam.

The solid graphene foam, when measured alone without Si nanowires in the pore, typically has a density from 0.01 to 1.7 g/cm$^3$, a specific surface area from 50 to 2,000 m$^2$/g, a thermal conductivity of at least 100 W/mK per unit of specific gravity, and/or an electrical conductivity no less than 1,000 S/cm per unit of specific gravity.

Typically, in the invented anode layer, the pore walls contain stacked graphene planes having an inter-plane spacing $d_{002}$ from 0.3354 nm to 0.36 nm as measured by X-ray diffraction. The pore walls can contain a pristine graphene and the solid graphene foam has a density from 0.5 to 1.7 g/cm$^3$. Alternatively, the non-pristine graphene material contains a content of non-carbon elements from 0.01% to 2.0% by weight. In one embodiment, the pore walls contain graphene fluoride and the solid graphene foam contains a fluorine content from 0.01% to 2.0% by weight. In another embodiment, the pore walls contain graphene oxide and the solid graphene foam contains an oxygen content from 0.01% to 2.0% by weight. Typically, the non-carbon elements include an element selected from oxygen, fluorine, chlorine, bromine, iodine, nitrogen, hydrogen, or boron. Typically, the solid graphene foam has a specific surface area from 200 to 2,000 m$^2$/g or a density from 0.1 to 1.5 g/cm$^3$.

Preferably, the solid graphene foam contains two pore size ranges, one from 2 nm to 50 nm for cushioning volume expansion of Si nanowires and the other from 200 nm to 20 μm to accommodate Si nanowires.

In a preferred embodiment, the anode layer is made from a layer that is a continuous-length roll sheet form having a thickness typically from 50 μm to 800 μm and a length of at least 2 meters and is produced by a roll-to-roll process.

In a desired embodiment, the graphene foam in the anode layer has an oxygen content or non-carbon content less than 1% by weight, and the pore walls have an inter-graphene spacing less than 0.35 nm, a thermal conductivity of at least 250 W/mK per unit of specific gravity, and/or an electrical conductivity no less than 2,500 S/cm per unit of specific gravity.

In a preferred embodiment, the graphene foam has an oxygen content or non-carbon content less than 0.01% by weight and the pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity. Further preferably, the graphene foam has an oxygen content or non-carbon content no greater than 0.01% by weight and the pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity. Most preferably, the graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

The pore walls may contain stacked graphene planes having an inter-graphene spacing less than 0.337 nm and a mosaic spread value less than 1.0. In an embodiment, the solid graphene foam exhibits a degree of graphitization no less than 80% and/or a mosaic spread value less than 0.4. More preferably, the solid graphene foam exhibits a degree of graphitization no less than 90% and/or a mosaic spread value no greater than 0.4. Typically, in the invented anode layer, the pore walls contain a 3D network of interconnected graphene planes. The graphene foam contains pores having a pore size from 20 nm to 500 nm.

The present invention also provides a lithium battery containing the anode or negative electrode as defined above, a cathode or positive electrode, and an electrolyte in ionic contact with the anode and the cathode. This lithium battery can further contain a cathode current collector in electronic contact with the cathode.

In an embodiment, the lithium battery further contains an anode current collector in electronic contact with the anode. Alternatively and more preferably, in the lithium battery, the graphene foam operates as an anode current collector to collect electrons from the anode active material during a charge of the lithium battery, which contains no separate or additional current collector. The lithium battery can be a lithium-ion battery, lithium metal battery, lithium-sulfur battery, or lithium-air battery.

In a preferred embodiment, the solid graphene foam-protected anode active material is made into a continuous-length roll sheet form (a roll of a continuous foam sheet) having a thickness no greater than 200 μm and a length of at least 1 meter long, preferably at least 2 meters, further preferably at least 10 meters, and most preferably at least 100 meters. This sheet roll is produced by a roll-to-roll process. There has been no prior art graphene foam that is made into a sheet roll form. It has not been previously found or suggested possible to have a roll-to-roll process for producing a continuous length of graphene foam, either pristine or non-pristine.

The solid graphene foam in the anode layer, when measured without Si, typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

This optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

The blowing agent can be a physical blowing agent, a chemical blowing agent, a mixture thereof, a dissolution-and-leaching agent, or a mechanically introduced blowing agent.

The process may further include a step of heat-treating the anode layer at a second heat treatment temperature higher than the first heat treatment temperature for a length of time sufficient for obtaining an anode layer wherein the pore walls contain stacked graphene planes having an inter-plane spacing $d_{002}$ from 0.3354 nm to 0.40 nm and a content of non-carbon elements less than 5% by weight (typically from 0.001% to 2%). When the resulting non-carbon element content is from 0.1% to 2.0%, the inter-plane spacing $d_{002}$ is typically from 0.337 nm to 0.40 nm.

If the original graphene material in the dispersion contains a fraction of non-carbon elements higher than 5% by weight, the graphene material in the solid graphene foam (after the heat treatment) contains structural defects that are induced during the step (d) of heat treating. The liquid medium can be simply water and/or an alcohol, which is environmentally benign.

In a preferred embodiment, the process is a roll-to-roll process wherein steps (b) and (c) include feeding the supporting substrate from a feeder roller to a deposition zone, continuously or intermittently depositing the graphene dispersion onto a surface of the supporting substrate to form the wet layer thereon, drying the wet layer to form the dried layer of material mixture, and collecting the dried layer of material mixture deposited on the supporting substrate on a collector roller. Such a roll-to-roll or reel-to-reel process is a truly industrial-scale, massive manufacturing process that can be automated.

In one embodiment, the first heat treatment temperature is from 100° C. to 1,500° C. In another embodiment, the second heat treatment temperature includes at least a temperature selected from (A) 300-1,500° C., (B) 1,500-2,100° C., and/or (C) 2,100-3,200° C. (preferably no greater than 2,500° C.). In a specific embodiment, the second heat treatment temperature includes a temperature in the range from 300-1,500° C. for at least 1 hour and then a temperature in the range from 1,500-2,500° C. for at least 1 hour.

There are several surprising results of conducting first and/or second heat treatments to the dried graphene-Si mixture layer, and different heat treatment temperature ranges enable us to achieve different purposes, such as (a) removal of non-carbon elements from the graphene material (e.g. thermal reduction of fluorinated graphene to obtain graphene or reduced graphene fluoride, RGF)) which generate volatile gases to produce pores or cells in a graphene material, (b) activation of the chemical or physical blowing agent to produce pores or cells, (c) chemical merging or linking of graphene sheets to significantly increase the lateral dimension of graphene sheets in the foam walls (solid portion of the foam), (d) healing of defects created during fluorination, oxidation, or nitrogenation of graphene planes in a graphite particle, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between graphene sheets, often in an edge-to-edge manner (some in face-to-face manner).

In one embodiment, the solid graphene foam, minus Si, has a specific surface area from 200 to 2,000 m$^2$/g. In one embodiment, the solid graphene foam has a density from 0.1 to 1.5 g/cm$^3$. In an embodiment, step (d) of heat treating the dried layer of graphene-Si mixture at a first heat treatment temperature is conducted under a compressive stress. In another embodiment, the process comprises a compression step to reduce a thickness, pore size, or porosity level of the sheet of graphene foam. In battery cells, the anode layer typically has a thickness from 10 μm to 800 μm, more typically from 50 μm to 500 μm.

In an embodiment, the graphene dispersion has at least 3% by weight of graphene oxide dispersed in the liquid medium to form a liquid crystal phase. In another embodiment, the graphene dispersion contains a graphene oxide dispersion prepared by immersing a graphitic material in a powder or fibrous form in an oxidizing liquid in a reaction vessel at a reaction temperature for a length of time sufficient to obtain the graphene dispersion wherein the graphitic material is selected from natural graphite, artificial graphite, mesophase carbon, mesophase pitch, mesocarbon microbead, soft carbon, hard carbon, coke, carbon fiber, carbon nanofiber, carbon nanotube, or a combination thereof and wherein the graphene oxide has an oxygen content no less than 5% by weight.

In an embodiment, the first heat treatment temperature contains a temperature in the range from 80° C.-300° C. and, as a result, the graphene foam has an oxygen content or non-carbon element content less than 5%, and the pore walls have an inter-graphene spacing less than 0.40 nm, a thermal conductivity of at least 150 W/mK (more typically at least 200 W/mk) per unit of specific gravity, and/or an electrical conductivity no less than 2,000 S/cm per unit of specific gravity.

In a preferred embodiment, the first and/or second heat treatment temperature contains a temperature in the range from 300° C.-1,500° C. and, as a result, the graphene foam has an oxygen content or non-carbon content less than 1%, and the pore walls have an inter-graphene spacing less than 0.35 nm, a thermal conductivity of at least 250 W/mK per unit of specific gravity, and/or an electrical conductivity no less than 2,500 S/cm per unit of specific gravity.

When the first and/or second heat treatment temperature contains a temperature in the range from 1,500° C.-2,100° C., the graphene foam has an oxygen content or non-carbon content less than 0.01% and pore walls have an inter-graphene spacing less than 0.34 nm, a thermal conductivity of at least 300 W/mK per unit of specific gravity, and/or an electrical conductivity no less than 3,000 S/cm per unit of specific gravity.

When the first and/or second heat treatment temperature contains a temperature greater than 2,100° C., the graphene foam has an oxygen content or non-carbon content no greater than 0.001% and pore walls have an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

If the first and/or second heat treatment temperature contains a temperature no less than 2,500° C., the graphene foam has pore walls containing stacked graphene planes having an inter-graphene spacing less than 0.336 nm, a mosaic spread value no greater than 0.4, and a thermal conductivity greater than 400 W/mK per unit of specific gravity, and/or an electrical conductivity greater than 4,000 S/cm per unit of specific gravity.

In one embodiment, the pore walls contain stacked graphene planes having an inter-graphene spacing less than 0.337 nm and a mosaic spread value less than 1.0. In another embodiment, the solid wall portion of the graphene foam exhibits a degree of graphitization no less than 80% and/or a mosaic spread value less than 0.4. In yet another embodiment, the solid wall portion of the graphene foam exhibits a degree of graphitization no less than 90% and/or a mosaic spread value no greater than 0.4.

Typically, the pore walls contain a 3D network of interconnected graphene planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 200 nm, more typically from 1 nm to 100 nm, further more typically from 1 nm to 40 nm, and most typically from 1 nm to 30 nm.

The present invention also provides a lithium battery containing the aforementioned anode layer, a cathode or positive electrode, and an electrolyte in ionic contact with the anode and the cathode. In certain embodiments, the lithium battery further contains a cathode current collector in electronic contact with the cathode. In some embodiments, the lithium battery further contains an anode current collector in electronic contact with the anode layer. In some preferred embodiments, the graphene foam in the lithium battery operates as an anode current collector to collect electrons from the anode active material during a charge of the lithium battery, which contains no separate or additional current collector.

DESCRIPTION OF THE PREFERRED EMBODIMENTS

This invention is directed at an anode electrode (negative electrode, e.g. in a layer form) containing graphene-protected Si nanowires for a lithium-ion battery, preferably based on a non-aqueous electrolyte (e.g. lithium salt dissolved in an organic solvent), a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration. The Si nanowires are mostly chemically bonded to graphene pore walls at one of the two ends of each Si nanowire.

Figure 3A:
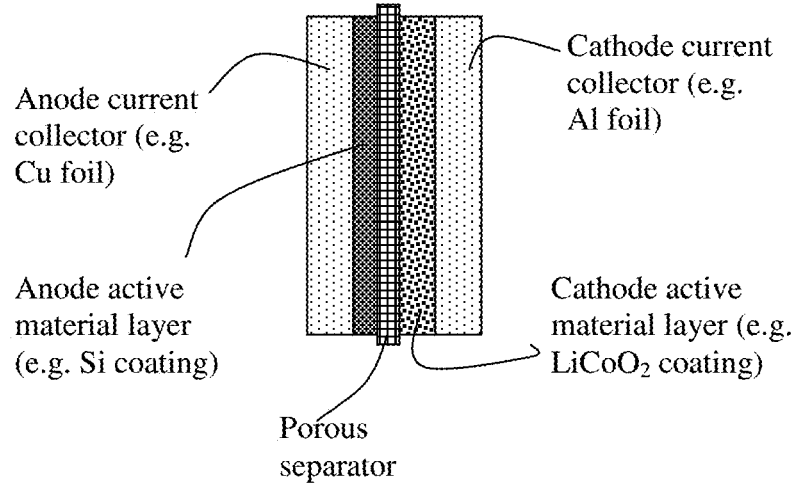
FIG. 3(A) schematic of a prior art lithium-ion battery cell, wherein the anode layer is a thin coating of an anode active material itself (e.g. Si coating)
Figure 3B:
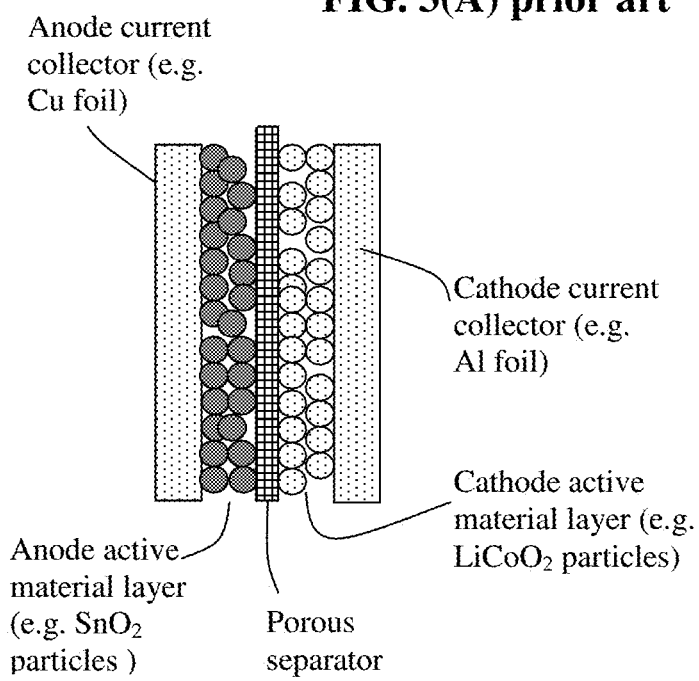
FIG. 3(B) schematic of another lithium-ion battery; the anode layer being composed of particles of an anode active material, a conductive additive (not shown) and a resin binder (not shown).

As illustrated in FIG. 3(A) and FIG. 3(B), a lithium-ion battery cell is typically composed of an anode current collector (e.g. Cu foil), an anode or negative electrode (anode layer typically containing an anode active material, a conductive additive, and a resin binder), a porous separator and/or an electrolyte component, a cathode electrode (typically containing a cathode active material, a conductive additive, and a resin binder), and a cathode current collector (e.g. Al foil). In a more commonly used cell configuration (FIG. 3(B)), the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area. This thickness range is an industry-accepted constraint under which a battery designer must work. This constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <<100 μm) does not contain a sufficient amount of an active lithium storage material (hence, insufficient current output); and (c) all non-active material layers in a battery cell (e.g. current collectors, conductive additive, binder resin, and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 3(A), the anode active material is in a thin film form deposited directly onto an anode current collector, such as a sheet of copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking. Such a constraint further diminishes the total lithium storage capacity and the lithium storage capacity per unit electrode surface area. Such a thin-film battery has very limited scope of application. On the other hand, a Si layer thicker than 100 nm has been found to exhibit poor cracking resistance during battery charge/discharge cycles. It takes but a few cycles to get such a thick film fragmented. These thin-film electrodes (with a thickness <100 nm) fall short of the required thickness by three (3) orders of magnitude. (A desirable electrode thickness is at least 100 μm, preferably greater than 200 μm.) As a further problem, Si or $SnO_2$ film-based anode layers cannot be too thick either since these materials are not very conductive to both electrons and lithium ions. A large layer thickness implies an excessively high internal resistance.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the graphene foam-protected anode active material (high-capacity Si nanowires).

In a preferred embodiment, the present invention provides an anode layer containing (A) a sheet of solid graphene foam composed of multiple pores and pore walls and (B) Si nanowires residing in some of these pores and being chemically bonded to pore walls (some pores remaining unoccupied, acting to cushion volume expansion of the anode active material). The invention also provides a process for producing such an anode layer.

Figure 1A:
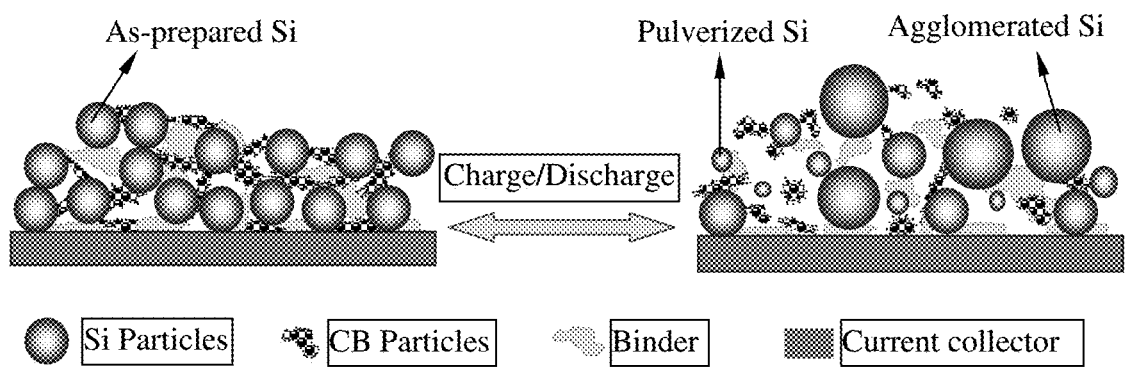
FIG. 1(A) schematic illustrating the notion that, in a prior art anode, expansion of Si particles, upon lithium intercalation, can lead to pulverization of Si particles, interruption of the conductive paths formed by the conductive additive, and loss of contact with the current collector.
Figure 1B:
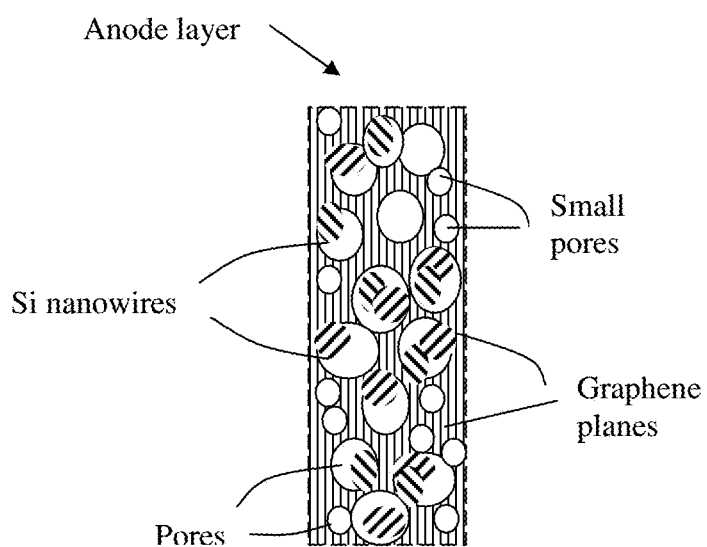
FIG. 1(B) schematic of a graphene foam-protected anode active material (Si nanowires end-bonded to graphene-based pore walls) according to an embodiment of instant invention.

More specifically, as illustrated in FIG. 1(B), the invented anode layer comprises an anode active material (Si nanowires) embedded in pores of a solid graphene foam, which is composed of multiple pores and pore walls (solid portion of the graphene foam), wherein (a) the pore walls contain a pristine graphene material having essentially zero % of non-carbon elements or a non-pristine graphene material having 0.001% to 5% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; (b) the Si nanowires are in an amount from 0.5% to 99% by weight (preferably from 2% to 90% by weight and more preferably from 5% to 80% by weight) based on the total weight of the graphene foam and the Si nanowires combined; and (c) some pores are lodged with Si nanowires and other pores are Si-free, and the graphene foam is sufficiently elastic to accommodate volume expansion and shrinkage of the Si nanowires during battery charge-discharge cycles to avoid expansion of the anode layer. The bonded graphene planes in the foam walls produced by the presently invented process are found to be capable of elastically deforming to the extent that is responsive to the expansion and shrinkage of the Si nanowires.

The solid graphene foam (alone, without Si) typically has a density from 0.01 to 1.7 g/cm$^3$, (more typically from 0.05 to 1.6 g/cm$^3$, further more typically from 0.1 to 1.5 g/cm$^3$, and more desirably from 0.5 to 0.01 to 1.3 g/cm$^3$), a specific surface area from 50 to 2,000 m$^2$/g, a thermal conductivity of at least 100 W/mK per unit of specific gravity, and/or an electrical conductivity no less than 1,000 S/cm per unit of specific gravity. It may be noted that these ranges of physical densities are not arbitrarily selected ranges. On the one hand, these densities are designed so that the internal pore amount (level of porosity) is sufficiently large to accommodate the maximum expansion of Si nanowires (e.g. approximately 300%-380% maximum volume expansion for Si). On the other hand, the pore amount cannot be too large (or physical density being too low); otherwise, the pore walls of the graphene foam structure cannot be sufficiently elastic (or, not capable of undergoing a large deformation that is fully recoverable or reversible).

Ideally, the pores should expand to the same extent as the embraced Si nanowires do; and should shrink back to the same extent as the anode active material particle. In other words, the graphene foam walls must be fully elastic to meet such a requirement. This is a most challenging task; but, we have surprisingly observed that good elasticity of graphene foam can be achieved with sufficiently long/wide graphene planes (length/width of graphene planes larger than pore diameters) and a sufficient amount (5%-50% of total pore volumes) of small pores (2-100 nm) that are not occupied by Si nanowires.

Briefly, the process for producing the invented anode layer comprises the following steps:
(a) Preparing a graphene dispersion having catalyst metal-coated Si particles and sheets of a graphene material (with or without catalyst metal deposited on graphene sheet surfaces) dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0/1.0 to 1.0/1.0 (this blowing agent is normally required if the graphene material is pristine graphene, typically having a blowing agent-to-pristine graphene weight ratio from 0.01/1.0 to 1.0/1.0).
(b) Dispensing and depositing the graphene dispersion onto a surface of a supporting substrate (e.g. plastic film, rubber sheet, metal foil, glass sheet, paper sheet, etc.) to form a wet layer of graphene-Si mixture, wherein the dispensing and depositing procedure (e.g. coating or casting) preferably includes subjecting the graphene dispersion to an orientation-inducing stress. This is followed by partially or completely removing the liquid medium from the wet layer of graphene material to form a dried layer of material mixture, with the graphene material having a content of non-carbon elements (e.g. O, H, N, B, F, Cl, Br, I, etc.) no less than 5% by weight (this non-carbon content, when being removed via heat-induced decomposition, produces volatile gases that act as a foaming agent or blowing agent); and
(c) Exposing the catalyst metal-coated mixture mass to a high temperature environment (preferably from 300° C. to 2,500° C., more preferably from 400° C. to 1,500° C., and most preferably from 500° C. to 1,200° C.) for a period of time sufficient to enable a catalytic metal-catalyzed growth of multiple silicon nanowires using the silicon particles as a feed material to form the anode of graphene foam-protected Si nanowires. These Si nanowires appear to have extruded out from the starting Si particles and emanate from surfaces of graphene sheets (if graphene sheet surfaces are also deposited with the catalyst metal). The silicon nanowires produced in this manner have a diameter less than 100 nm (typically <20 nm if further emanated from graphene pore wall surfaces) and a length-to-diameter aspect ratio of at least 5 (more typically l/d=10-10,000 and most typically 100-1,000). The heat exposure also induces volatile gas molecules from the non-carbon elements in the graphene material or to activate the blowing agent for producing the solid graphene foam. The resulting graphene foam, when measured without Si, typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

Figure 10A:
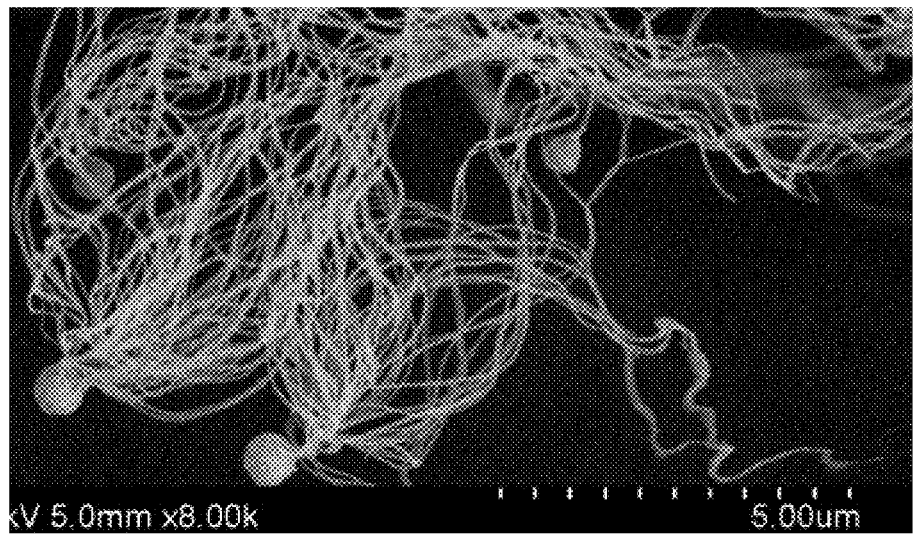
FIG. 10(A) SEM image showing Si nanowires grown out of previously larger-diameter Si particles (originally 3-5 μm); these Si nanowires grow by feeding on these Si particles which become smaller or even disappear (being totally consumed).
Figure 10B:
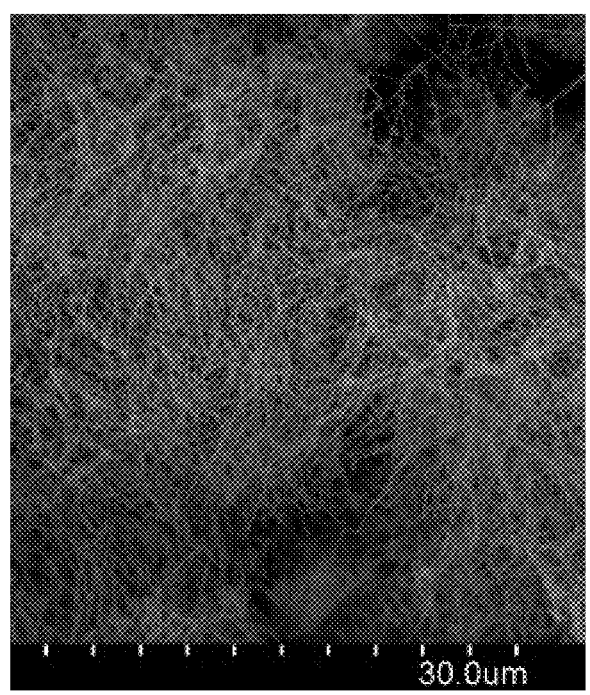
FIG. 10(B) SEM image showing Si nanowires emanated from graphene surfaces; these Si nanowires being much smaller in diameter as compared to those directly grown from Si micron particles without the presence of catalyst metal-coated graphene sheets.

The present invention provides a process for initiating and growing Si nanowires from micron or sub-micron scaled silicon particles having a particle diameter from 0.2 μm to 20 μm. In other words, the starting material is micron or sub-micron scaled silicon particles, which are thermally and catalytically converted directly into nanoscaled, wire-shaped Si having a diameter or thickness less than 100 nm, more typically less than 50 nm and most typically less than 20 nm (often as small as 2-10 nm). Studies using scanning electron microscopy (SEM) indicate that tens or hundreds of nanowires can be grown or "extruded out" from a starting solid Si particle. As an example, FIG. 10(A) shows that hundreds of Si nanowires have been sprouted or emanated from just a few Si particles that were originally 3-5 μm in diameter. These Si nanowires have drawn the needed Si atoms from the few starting Si particles. By "spitting" out such a large number of nanowires, the original Si particles (without the help from graphene sheets) were reduced to approximately 0.6 μm in diameter. When being surrounded by catalyst metal-deposited graphene pore walls, essentially all the micron or sub-micron Si particles are totally "eaten up"; there is typically no residual Si particles left (e.g. FIG. 10(B)).

The catalytic metal deposited on Si particle or graphene sheet surfaces is preferably in the form of a nanoscaled coating (having a thickness less than 100 nm, preferably less than 50 nm, more preferably less than 20 nm, and most preferably less than 10 nm) or nanoscaled particles (having a diameter less than 100 nm, preferably less than 50 nm, more preferably less than 20 nm, and most preferably less than 10 nm). Thinner metal coating or smaller particles of metal are more effective in producing a larger number of smaller Si nanowires, which are preferred features when it comes to using Si nanowires as an anode active material of a lithium-ion battery.

There are at least three sequences to follow for the deposition of catalyst metal coating or particles on Si particle surfaces and/or graphene sheet surfaces. The first possible sequence involves depositing surfaces of micron- or sub-micron-sized Si particles with catalyst metal (e.g. Ni) before these Si particles are dispersed in graphene suspension. The second possible sequence involves depositing catalyst metal onto both surfaces of Si particles and surfaces of graphene sheets before these Si particles and graphene sheets are dispersed in a liquid medium to form a graphene dispersion. The third possible sequence entails dispersing Si particles (un-coated with catalyst metal) and graphene sheets (un-coated with catalyst metal) into a liquid medium, which also contains a catalyst metal precursor dissolved therein. After the dispersion is dispensed and deposited to form a layer and during a subsequent heat treatment, the precursor is thermally converted to catalyst metal coating or nanoparticles which naturally deposits onto surfaces of Si particles and pore walls (surfaces of graphene planes) of the resulting graphene foam.

In the first two possible sequences, the catalyst metal-coated Si particles may be produced by a step of depositing a catalyst metal on Si particle surfaces using a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof. The catalyst metal may be selected from Cu, Ni, Co, Mn, Fe, Ti, Al, Ag, Au, Pt, Pd, or a combination thereof. It may be noted that the high temperature range required of Si nanowire growth depends on the catalytic metal used. For instance, for Cu, Ni, and/or Fe, the range is preferably from 700° C. to 1,000° C. For the catalysts containing noble metals, the reaction temperatures are preferably and typically higher.

The catalyst metal may be deposited on Si and graphene sheet surfaces by a procedure including (a) dissolving or dispersing a catalytic metal precursor in a liquid to form a precursor solution, (b) bringing the precursor solution in contact with surfaces of the graphene sheets and surfaces of Si particles, (c) removing the liquid; and (d) chemically or thermally converting the catalytic metal precursor to become catalyst metal coating or nanoparticles.

In the invented process that involves the third possible sequence, step (d) of chemically or thermally converting the catalytic metal precursor may be conducted concurrently with the procedure (c) of exposing the dried layer of graphene/Si mixture to a high temperature environment. The process catalytic metal precursor may be a salt or organometal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

Thus, in certain embodiments of the invention, the process comprises: (A) dispersing Si particles, graphene sheets, a catalytic metal precursor, and an optional blowing agent in a liquid to form a graphene/Si dispersion, wherein the Si particles have a diameter from 0.2 μm to 20 μm and contain pure Si having at least 99.9% by weight of Si element or a Si alloy or mixture having from 70% to 99.9% by weight of Si therein; (B) dispensing and depositing the graphene/Si dispersion onto a surface of a supporting substrate to form a wet layer of graphene/Si mixture and partially or completely removing the liquid medium from the wet layer of graphene/Si mixture to form a dried layer of graphene/Si mixture material; and (C) exposing said dried layer of graphene/Si mixture to a high temperature environment, from 100° C. to 2,500° C., for a period of time sufficient to thermally convert the catalytic metal precursor to a coating or nanoparticles of a catalyst metal deposited on surfaces of Si particles and/or surfaces of graphene sheets, to induce volatile gas molecules from the graphene sheets or to activate the blowing agent for producing the graphene foam, and, concurrently or sequentially, to enable a catalyst metal-catalyzed growth of multiple Si nanowires emanating from the Si particles as a feed material in pores of the graphene foam to form the anode electrode layer; wherein the Si nanowires have a diameter less than 100 nm and a length-to-diameter aspect ratio of at least 5 and the Si nanowires are in an amount from 0.5% to 95% by weight based on the total weight of the graphene foam and the Si nanowires combined.

The pores in the graphene foam are formed slightly before, during, or after sheets or molecules of a graphene material are (1) chemically linked/merged together (edge-to-edge and/or face-to-face) typically at a temperature from 100 to 1,500° C. and/or (2) re-organized into larger graphite crystals or domains (herein referred to as re-graphitization) along the pore walls at a high temperature (typically >2,100° C. and more typically >2,500° C.).

The Si nanowires are naturally embraced by graphene pore walls, typically leaving behind some gaps between the nanowires and the pore walls. Hence, where Si particles are present, there are pores in the graphene foam. However, there are additional pores that are formed due to the evolution of volatile gases (from a blowing agent and/or non-carbon elements, such as —OH, —F, etc.) during the heat treatment of the dried graphene layer. These pores play the role of cushioning the local volume expansion of Si nanowires, thereby avoiding global expansion of the resulting anode layer. The ability of the pore walls to snap back in congruence with the shrinkage extent of the anode active material (Si nanowires) comes from the surrounding graphene sheets that are bonded and joint to form larger and stronger graphene planes during heat treatments.

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been previously taught or hinted that an aggregate of graphene sheets can be converted into a graphene foam via a blowing agent. The cellular structure in a polymer matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

For instance, as discussed in the Background section, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Figure 2:
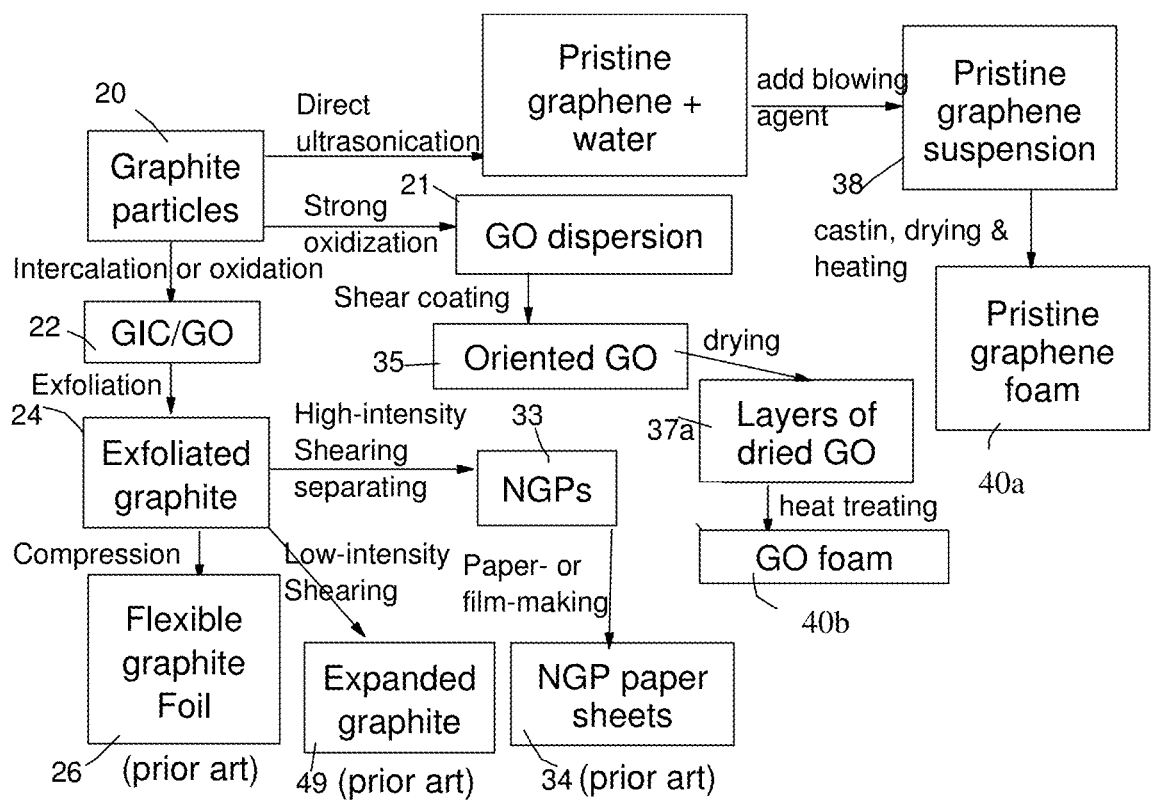
FIG. 2 A flow chart illustrating various prior art processes of producing exfoliated graphite products (flexible graphite foils and expanded graphite flakes), along with a process for producing pristine graphene foam 40a or graphene oxide foams 40b.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension. A chemical blowing agent may then be dispersed into the dispersion (38 in FIG. 2). This suspension is then cast or coated onto the surface of a solid substrate (e.g. glass sheet or Al foil). When heated to a desired temperature, the chemical blowing agent is activated or decomposed to generate volatile gases (e.g. $N_2$ or $CO_2$), which act to form bubbles or pores in an otherwise mass of solid graphene sheets, forming a pristine graphene foam 40*a*.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The pore walls (cell walls or solid graphene portion) in the graphene foam of the presently invented anode contain chemically bonded and merged graphene planes. These planar aromatic molecules or graphene planes (hexagonal structured carbon atoms) are well interconnected physically and chemically. The lateral dimensions (length or width) of these planes are huge (e.g. from 20 nm to >10 μm), typically several times or even orders of magnitude larger than the maximum crystallite dimension (or maximum constituent graphene plane dimension) of the starting graphite particles. The graphene sheets or planes are essentially merged and/or interconnected to form electron-conducting pathways with low resistance. This is a unique and new class of material that has not been previously discovered, developed, or suggested to possibly exist.

In order to illustrate how the presently invented process works to produce a graphene foam-protected anode layer, we herein make use of graphene oxide (GO) and graphene fluoride (GF) as two examples. These should not be construed as limiting the scope of our claims. In each case, the first step involves preparation of a graphene dispersion (e.g. GO+water or GF+organic solvent, DMF) containing an optional blowing agent. If the graphene material is pristine graphene containing no non-carbon elements, a blowing agent is required.

In step (b), the GF or GO suspension (21 in FIG. 2), but now also containing Si particles is formed into a wet GF or GO layer 35 on a solid substrate surface (e.g. PET film or glass) preferably under the influence of a shear stress. One example of such a shearing procedure is casting or coating a thin film of GF or GO suspension using a coating machine. This procedure is similar to a layer of varnish, paint, coating, or ink being coated onto a solid substrate. The roller or wiper creates a shear stress when the film is shaped, or when there is a high relative motion between the roller/blade/wiper and the supporting substrate. Quite unexpectedly and significantly, such a shearing action enables the planar GF or GO sheets to well align along, for instance, a shearing direction. Further surprisingly, such a molecular alignment state or preferred orientation is not disrupted when the liquid components in the GF or GO suspension are subsequently removed to form a well-packed layer of highly aligned GF or GO sheets that are at least partially dried. The dried GF or GO mass 37a has a high birefringence coefficient between an in-plane direction and the normal-to-plane direction.

In an embodiment, this GF or GO layer, each containing Si particles therein, is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene material, pushing solid graphene sheets into a foam wall structure, forming a graphene oxide foam (40b in FIG. 2). If no blowing agent is added, the non-carbon elements in the graphene material preferably occupy at least 10% by weight of the graphene material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between graphene planes (GO or GF planes) in an edge-to-edge and face-to-face manner can occur at a relatively low heat treatment temperature (e.g. even as low as from 150 to 300° C.).

The foamed graphene material may be subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried graphene layer experiences may be divided into three distinct HTT regimes:

Regime 1 (80° C. to 300° C.): In this temperature range (the thermal reduction regime and also the activation regime for a blowing agent, if present), a GO or GF layer primarily undergoes thermally-induced reduction reactions, leading to a reduction of oxygen content or fluorine content from typically 20-50% (of O in GO) or 10-25% (of F in GF) to approximately 5-6%. This treatment results in a reduction of inter-graphene spacing in foam walls from approximately 0.6-1.2 nm (as dried) down to approximately 0.4 nm, and an increase in thermal conductivity to 200 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between graphene sheets occurs. The inter-GO or inter-GF planar spacing remains relatively large (0.4 nm or larger). Many O- or F-containing functional groups survive.

Regime 2 (300° C.-1,500° C.): Two important events occur in this temperature range:
  a) The first event relates to the formation of the graphene foam structure. In this chemical linking regime, extensive chemical combination, polymerization, and cross-linking between adjacent GO or GF sheets occur. The oxygen or fluorine content is reduced to typically <1.0% (e.g. 0.7%) after chemical linking, resulting in a reduction of inter-graphene spacing to approximately 0.345 nm. This implies that some initial re-graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to 250 W/mK per unit of specific gravity, and/or electrical conductivity to 2,500-4,000 S/cm per unit of specific gravity.
  b) The second event entails the growth of Si nanowires from metal catalyst-coated Si particles inside pores of the graphene foam and some being further emanated from graphene pore wall surfaces (provided the original graphene sheets are also catalyst metal-coated).
Regime 3 (1,500-2,500° C.): In this ordering and re-graphitization regime, extensive graphitization or graphene plane merging occurs, leading to significantly improved degree of structural ordering in the foam walls. As a result, the oxygen or fluorine content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

The presently invented graphene foam structure containing an anode active material therein can be obtained by heat-treating the dried GO or GF layer with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and can cover all the 4 regimes (including Regime 4 for 0.2 to 1 hour, may be implemented to achieve the highest conductivity).

If the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, or a combination thereof, and wherein the maximum heat treatment temperature (e.g. both the first and second heat treatment temperatures) is (are) less than 2,500° C., then the resulting solid graphene foam typically contains a content of non-carbon elements in the range from 0.01% to 2.0% by weight (non-pristine graphene foam).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

Figure 4:
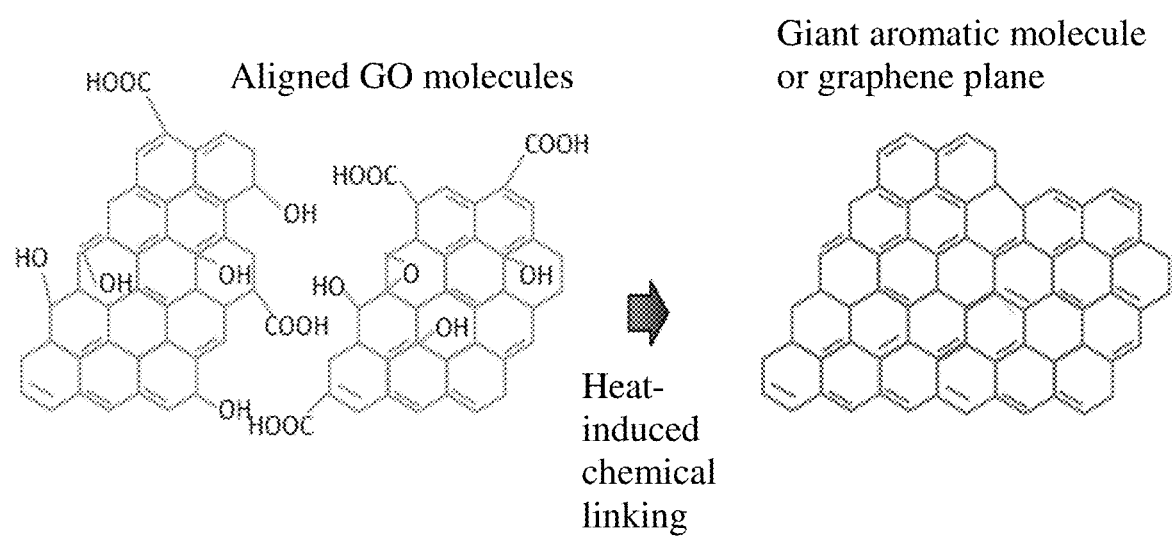
FIG. 4 A possible mechanism of chemical linking between graphene oxide sheets, which mechanism effectively increases the graphene sheet lateral dimensions, making the pore walls interconnected forming a 3D network of electron-conducting pathways and imparting high structural integrity and elasticity (ability to undergo elastic deformation that is fully recoverable).

Illustrated in FIG. 4 is a plausible chemical linking mechanism where only 2 aligned GO molecules are shown as an example, although a large number of GO molecules can be chemically linked together to form a foam wall. Further, chemical linking could also occur face-to-face, not just edge-to-edge for GO, GF, and chemically functionalized graphene sheets. These linking and merging reactions proceed in such a manner that the molecules are chemically merged, linked, and integrated into one single entity. The graphene sheets (GO or GF sheets) completely lose their own original identity and they no longer are discrete sheets/platelets/flakes. The resulting product is not a simple aggregate of individual graphene sheets, but a single entity that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if the HTT is sufficiently high (e.g. >1,500° C. or much higher), these graphene planes are essentially bonded together with one another. The graphene foam of the presently invented anode layer has the following unique and novel features that have never been previously taught or hinted:

(1) In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 μm, and, in many cases, >>10 μm, or even >>100 μm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphene planes.

(2) These interconnected large graphene planes in the graphene foam walls form an integral 3D network of graphene that is not only highly conducting but also elastic, enabling the foam pores to expand and shrink reversibly and in congruent with Si nanowires lodged in the pores without inducing significant anode electrode expansion or shrinkage in the battery.

(3) This graphene foam wall is not made by gluing or bonding discrete flakes/platelets together with a resin binder, linker, or adhesive. Instead, GO sheets (molecules) from the GO dispersion or the GF sheets from the GF dispersion are merged through joining or forming of covalent bonds with one another, into an integrated graphene entity, without using any externally added linker or binder molecules or polymers. For a lithium battery featuring such an anode layer, there is no need to have non-active materials, such as a resin binder or a conductive additive, which are incapable of storing lithium. This implies a reduced amount of non-active materials or increased amount of active materials in the anode, effectively increasing the specific capacity per total anode weight, mAh/g (of composite).

(4) The graphene foam pore walls are typically a poly-crystal composed of large graphene grains having incomplete or poorly defined grain boundaries. This entity is derived from a GO or GF suspension, which is in turn obtained from natural graphite or artificial graphite particles originally having multiple graphite crystallites. Prior to being chemically oxidized or fluorinated, these starting graphite crystallites have an initial length ($L_a$ in the crystallographic a-axis direction), initial width ($L_b$ in the b-axis direction), and thickness ($L_c$ in the c-axis direction). Upon oxidation or fluorination, these initially discrete graphite particles are chemically transformed into highly aromatic graphene oxide or graphene fluoride molecules having a significant concentration of edge- or surface-borne functional groups (e.g. —F, —OH, —COOH, etc.). These aromatic GO or GF molecules in the suspension have lost their original identity of being part of a graphite particle or flake. Upon removal of the liquid component from the suspension, the resulting GO or GF molecules form an essentially amorphous structure. Upon heat treatments, these GO or GF molecules are chemically merged and linked into a unitary or monolithic graphene entity that constitutes the foam wall. This foam wall is highly ordered.

The resulting unitary graphene entity in the foam wall typically has a length or width significantly greater than the $L_a$ and $L_b$ of the original crystallites. The length/width of this graphene foam wall entity is significantly greater than the $L_a$ and $L_b$ of the original crystallites. Even the individual grains in a poly-crystalline graphene wall structure have a length or width significantly greater than the $L_a$ and $L_b$ of the original crystallites.

(5) The large length and width of the graphene planes enable the foam walls to be of high mechanical strength and elasticity. In comparative experiments, we observe that without this feature (i.e. no chemical merging of graphene planes), conventionally made graphene foams composed of aggregates of discrete graphene sheets, are very weak, fragile, and non-elastic (deformation not reversible); foam walls being easily collapsed or broken.

(6) Due to these unique chemical composition (including oxygen or fluorine content), morphology, crystal structure (including inter-graphene spacing), and structural features (e.g. high degree of orientations, few defects, incomplete grain boundaries, chemical bonding and no gap between graphene sheets, and substantially no interruptions in graphene planes), the GO- or GF-derived graphene foam has a unique combination of outstanding thermal conductivity, electrical conductivity, mechanical strength, and stiffness (elastic modulus).

The following examples are used to illustrate some specific details about the best modes of practicing the instant invention and should not be construed as limiting the scope of the invention.

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bicarbonate (baking soda), hydrazine, hydrazide, azodicarbonamide (exothermic chemical blowing agents), nitroso compounds (e.g. N, N-dinitroso pentamethylene tetramine), hydrazine derivatives (e.g. 4. 4'-oxybis (benzenesulfonyl hydrazide) and hydrazo dicarbonamide), and hydrogen carbonate (e.g. sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of graphene material is capable of maintaining a controlled amount of pores or bubbles during liquid removal and subsequent heat treatments.

Technically feasible blowing agents include carbon dioxide ($CO_2$), nitrogen ($N_2$), isobutane ($C_4H_{10}$), cyclopentane ($C_5H_{10}$), isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Example 2: Preparation of Discrete Functionalized GO Sheets and Graphene Foam

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After a drying treatment at 100° C. overnight, the resulting graphite intercalation compound (GIC) or graphite oxide fiber was re-dispersed in water-alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and a desired amount of Si particles (0.6-2.5 μm in diameter) was added to the suspensions. On a separate basis, a metal salt solution of cobalt carboxylate and manganese carboxylate (as a catalyst metal precursor) in water was prepared. The metal salt solution, along with 2% baking soda as a blowing agent, was then added to the GO/Si or f-GO/Si suspensions to form mixture slurries. The resulting slurries were allowed to stay in the container without any mechanical disturbance for 2 days.

The resulting slurries containing GO/Si/metal salt or f-GO/Si/metal salt were then comma-coated onto a PET film surface. The resulting coating films of GO/Si/metal salt or f-GO/Si/metal salt, after removal of liquid, have a thickness that was from 100 to 800 μm. The films were then subjected to heat treatments that involve an initial heat treatment temperature of 500° C. for 2 hours (in a mixture of $H_2$ and $N_2$) to enable formation of a foamed structure and deposition of Co or Mn on surfaces of both Si particles and pore walls. This is followed by exposing the foam at a second temperature of 800-1,200° C. (in Ar gas atmosphere) for different specimens to induce growth of Si nanowires from both Si particles and pore walls.

Example 3: Preparation of Single-Layer Graphene Sheets from Mesocarbon Microbeads (MCMBs) and Graphene Foam Mesocarbon microbeads (MCMBs) were supplied from China Steel Chemical Co., Kaohsiung, Taiwan. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Ni-coated Si particles (diameter of 1-6 μm) were added to the GO suspension. Baking soda (5-20% by weight), as a chemical blowing agent, was also added to the suspension just prior to casting. The suspension was then cast onto a glass surface using a doctor's blade to exert shear stresses, inducing GO sheet orientations. Several samples were cast, some containing a blowing agent and some not. The resulting GO films, after removal of liquid, have a thickness that can be varied from approximately 10 to 500 μm.

The several sheets of the GO film, with or without a blowing agent, were then subjected to heat treatments that involve an initial (first) thermal reduction temperature of 80-500° C. for 1-5 hours. This first heat treatment generated a graphene foam. The foam was then subjected to a second temperature of 750-950° C., enabling growth of Si nanowires from Si particles in pores of the graphene foam layer.

Example 4: Preparation of Pristine Graphene Foam (0% Oxygen)

Recognizing the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements.

Sputtering was used for deposition of metal catalyst (e.g. Ni, Ag, and Ni/Ag mixture) onto Si particles and/or various graphene sheets (pristine graphene, RGO, and GO).

Various amounts (1%-30% by weight relative to graphene material) of chemical bowing agents (N, N-binitroso pentamethylene tetramine or 4. 4'-oxybis (benzenesulfonyl hydrazide) and metal-coated Si particles were added to a suspension containing pristine graphene sheets and a surfactant. The suspension was then slot die-coated onto a PET film surface, which involves shear stress-induced orientation of graphene sheets. The resulting graphene-Si films, after removal of liquid, have a thickness from approximately 100 to 750 µm.

The graphene films were then subjected to heat treatments that involve an initial (first) temperature of 80-1,500° C. for 1-5 hours, which led to the production of a graphene foam layer. Some of the pristine foam samples were then subjected to a heat treatment at a second temperature of 700-2,500° C. to induce growth of Si nanowires from Si particles.

Example 4-a and Comparative Example 4-b: Pristine Graphene Foam-Protected Anode Vs. Prior Art Pristine Graphene Paper/Film-Protected Anode Separately, a graphene film containing 65% by weight of Si particles (plus 5% by weight of the chemical blowing agent) was cast and heat treated up to 1,500° C. to obtain a layer of graphene foam protected anode active material. For comparison purpose, a graphene film (paper) containing 65% by weight of Si nanowires (without any blowing agent) was cast and heat treated up to 1,500° C. to obtain a layer of graphene-protected anode active material. The anode specific capacity of these two anode layers was then evaluated using a lithium metal as the counter-electrode in a half-cell configuration. The specific capacity values of a lithium battery having a pristine graphene foam-protected Si and those of a pristine graphene-Si mixture as an electrode material are plotted as a function of the number of charge-discharge cycles. These results clearly demonstrate that the presently invented graphene foam having small pores, along with those pores occupied by Si nanowires, provides a lithium battery with more stable cycling stability.

Comparative Example 3/4-b: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 3/4-c: Conventional Graphitic Foam from Pitch-Based Carbon Foams Pitch powder, granules, or pellets are placed in a aluminum mold with the desired final shape of the foam. Mitsubishi ARA-24 mesophase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Samples from this conventional graphitic foam were machined into specimens for measuring the thermal conductivity. The bulk thermal conductivity of the graphitic foam was found to be in the range from 67 W/mK to 151 W/mK. The density of the samples was from 0.31 to 0.61 g/cm$^3$. When the material porosity level is taken into account, the specific thermal conductivity of the mesophase pitch derived foam is approximately 67/0.31=216 and 151/0.61=247.5 W/mK per specific gravity (or per physical density). In contrast, the specific thermal conductivity of the presently invented foam is typically >>250 W/mK per specific gravity.

The compression strength of the conventional graphitic foam samples having an average density of 0.51 g/cm³ was measured to be 3.6 MPa and the compression modulus was measured to be 74 MPa. By contrast, the compression strength and compressive modulus of the presently invented graphene foam samples derived from GO having a comparable physical density are 5.7 MPa and 103 MPa, respectively.

Figure 5A:
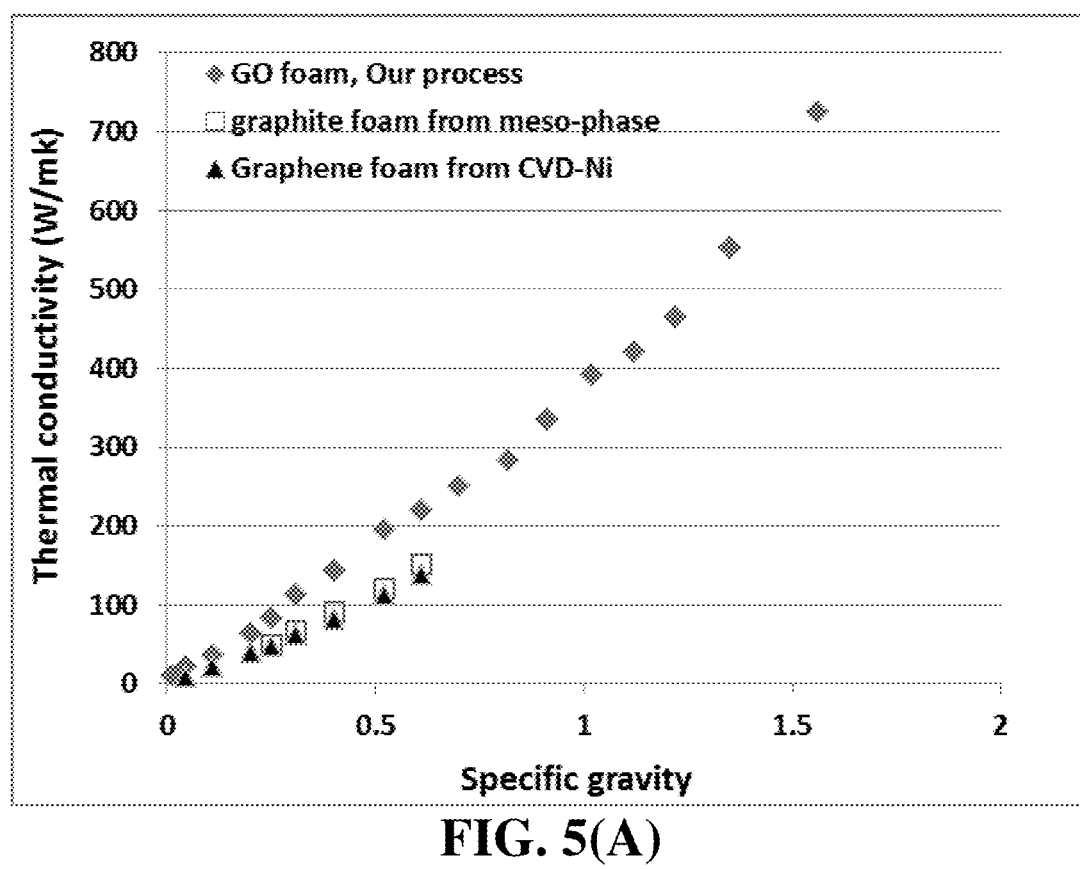
FIG. 5(A) Thermal conductivity values vs. specific gravity of the GO suspension-derived foam produced by the presently invented process, mesophase pitch-derived graphite foam, and Ni foam-template assisted CVD graphene foam.
Figure 6A:
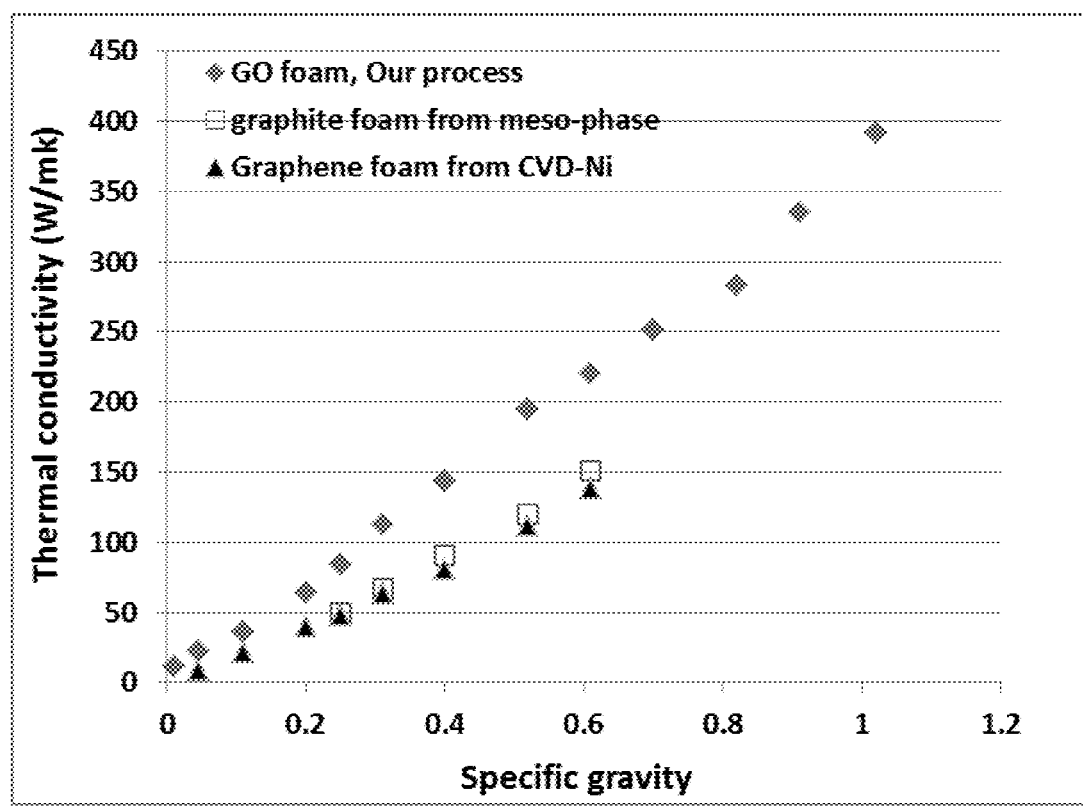
FIG. 6(A) Thermal conductivity values (vs. specific gravity values up to 1.02 g/cm³) of the GO suspension-derived foam, mesophase pitch-derived graphite foam, and Ni foam-template assisted CVD graphene foam.

Shown in FIG. 5(A) and FIG. 6(A) are the thermal conductivity values vs. specific gravity of the GO suspension-derived foam (Example 3), mesophase pitch-derived graphite foam (Comparative Example 3/4-b), and Ni foam template-assisted CVD graphene foam (Comparative Example 3/4-c). These data clearly demonstrate the following unexpected results:

1) GO-derived graphene foams produced by the presently invented process exhibit significantly higher thermal conductivity as compared to both mesophase pitch-derived graphite foam and Ni foam template-assisted CVD graphene, given the same physical density. Higher thermal and electrical conductivities of electrodes are highly beneficial to electrochemical behaviors of lithium-ion batteries.
2) This is quite surprising in view of the notion that CVD graphene is essentially pristine graphene that has never been exposed to oxidation and should have exhibited a much higher thermal conductivity compared to graphene oxide (GO). GO is known to be highly defective (having a high defect population and, hence, low conductivity) even after the oxygen-containing functional groups are removed via conventional thermal or chemical reduction methods. These exceptionally high thermal conductivity values observed with the GO-derived graphene foams herein produced are much to our surprise. A good thermal dissipation capability is essential to the prevention of thermal run-away and explosion, a most serious problem associated with rechargeable lithium-ion batteries.
3) FIG. 6(A) presents the thermal conductivity values over comparable ranges of specific gravity values to allow for calculation of specific conductivity (conductivity value, W/mK, divided by physical density value, g/cm³) for all three graphitic foam materials based on the slopes of the curves (approximately straight lines at different segments). These specific conductivity values enable a fair comparison of thermal conductivity values of these three types of graphitic foams given the same amount of solid graphitic material in each foam. These data provide an index of the intrinsic conductivity of the solid portion of the foam material. These data clearly indicate that, given the same amount of solid material, the presently invented GO-derived foam is intrinsically most conducting, reflecting a high level of graphitic crystal perfection (larger crystal dimensions, fewer grain boundaries and other defects, better crystal orientation, etc.). This is also unexpected.
4) The specific conductivity values of the presently invented GO- and GF-derived foam exhibit values from 250 to 500 W/mK per unit of specific gravity; but those of the other two foam materials are typically lower than 250 W/mK per unit of specific gravity.

Figure 8:
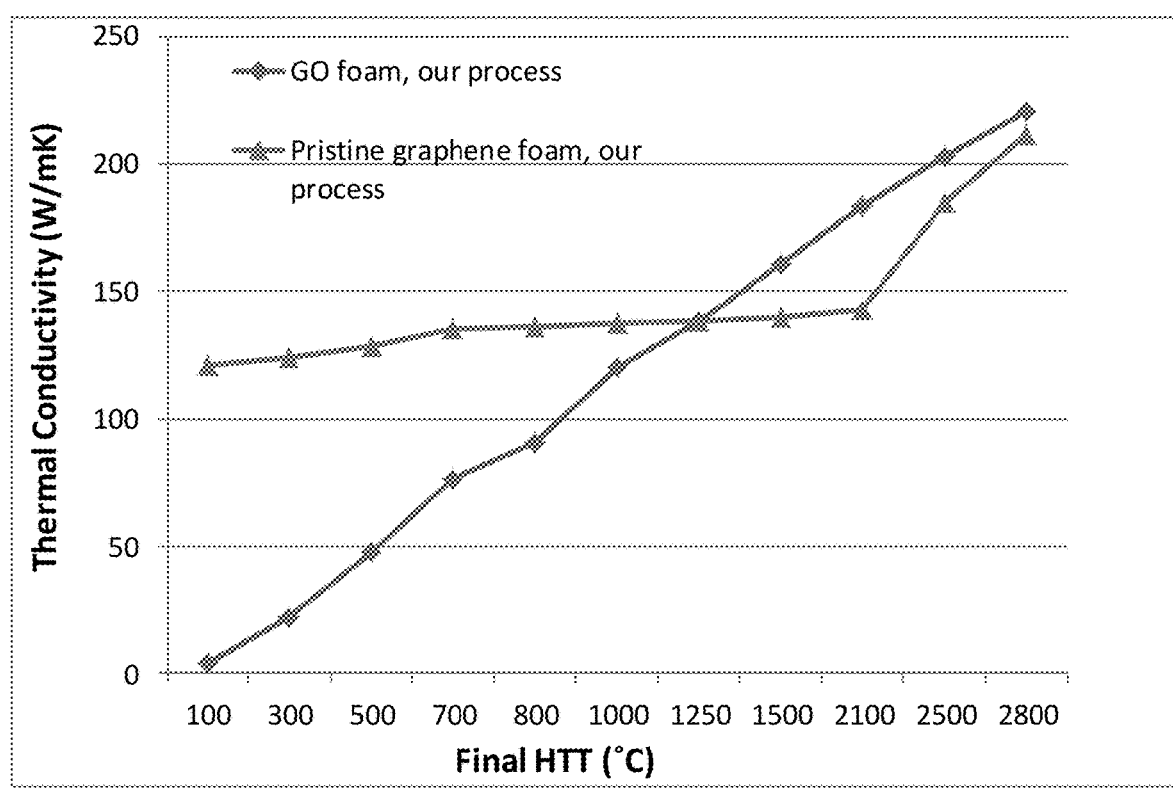
FIG. 8 Thermal conductivity values of graphene foam samples derived from GO and pristine graphene as a function of the final (maximum) heat treatment temperature.

Summarized in FIG. 8 are thermal conductivity data for a series of GO-derived graphene foams and a series of pristine graphene derived foams, both plotted over the final (maximum) heat treatment temperatures. These data indicate that the thermal conductivity of the GO foams is highly sensitive to the final heat treatment temperature (HTT). Even when the HTT is very low, clearly some type of graphene merging or crystal perfection reactions are already activated. The thermal conductivity increases monotonically with the final HTT. In contrast, the thermal conductivity of pristine graphene foams remains relatively constant until a final HTT of approximately 2,500° C. is reached, signaling the beginning of a re-crystallization and perfection of graphite crystals. There are no functional groups in pristine graphene, such as —COOH in GO, that enable chemical linking of graphene sheets at relatively low HTTs. With a HTT as low as 1,250° C., GO sheets can merge to form significantly larger graphene sheets with reduced grain boundaries and other defects. Even though GO sheets are intrinsically more defective than pristine graphene, the presently invented process enables the GO sheets to form graphene foams that outperform pristine graphene foams. This is another unexpected result.

Example 5: Preparation of Graphene Oxide (GO) Suspension from Natural Graphite and Subsequent Preparation of GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction>3% and typically from 5% to 15%.

By dispensing and coating the GO suspension (containing metal-coated Si particles) on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 750-1,500° C. for 0.5-5 hours, followed by a controlled cool-down procedure. With these heat treatments, also under a compressive stress, the GO films were transformed into graphene foam and Si nanowires were grown inside foam pores.

Comparative Example 5-a: Graphene Foams from Hydrothermally Reduced Graphene Oxide For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature.

Comparative Example 5-b: Plastic Bead Template-Assisted Formation of Reduced Graphene Oxide Foams A hard template-directed ordered assembly for a macroporous bubbled graphene film (MGF) was prepared. Monodisperse poly methyl methacrylate (PMMA) latex spheres were used as the hard templates. The GO liquid crystal prepared in Example 5 was mixed with a PMMA spheres suspension. Subsequent vacuum filtration was then conducted to prepare the assembly of PMMA spheres and GO sheets, with GO sheets wrapped around the PMMA beads. A composite film was peeled off from the filter, air dried and calcinated at 800° C. to remove the PMMA template and thermally reduce GO into RGO simultaneously. The grey free-standing PMMA/GO film turned black after calcination, while the graphene film remained porous.

Figure 5B:
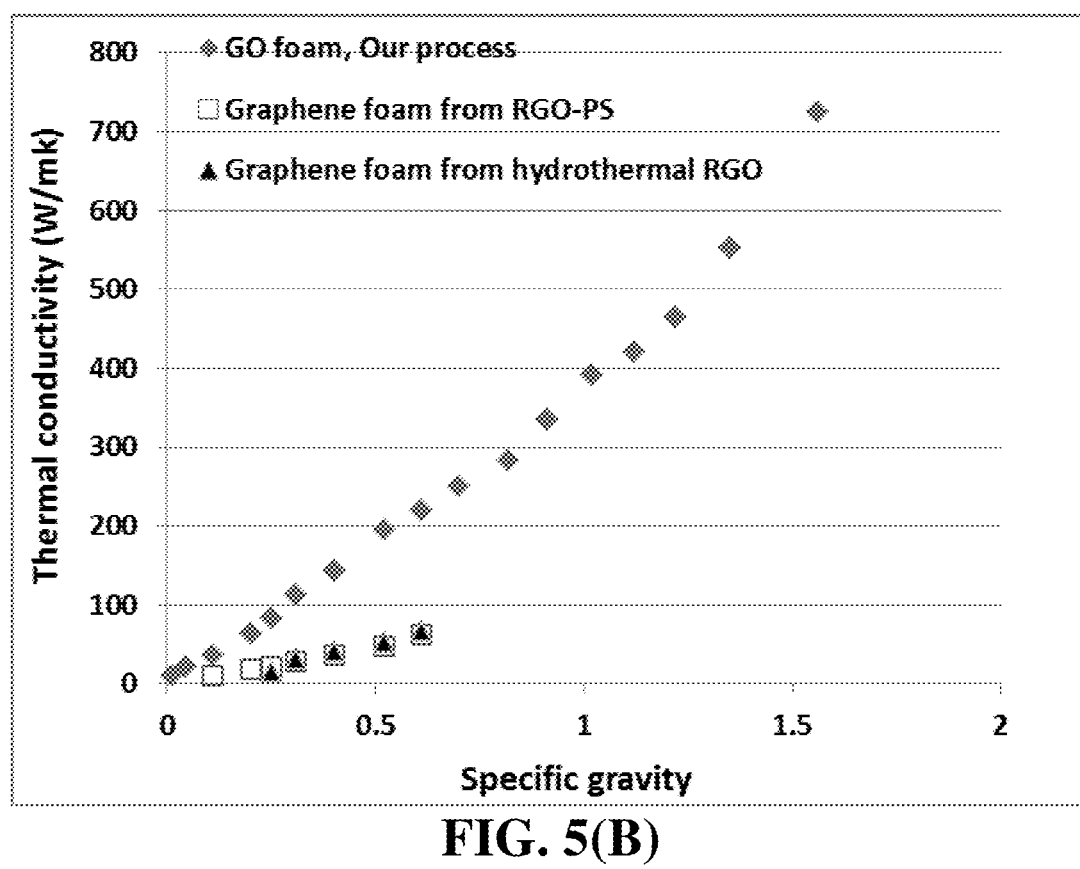
FIG. 5(B) Thermal conductivity values of the GO suspension-derived foam, sacrificial plastic bead-templated GO foam, and the hydrothermally reduced GO graphene foam.
Figure 5C:
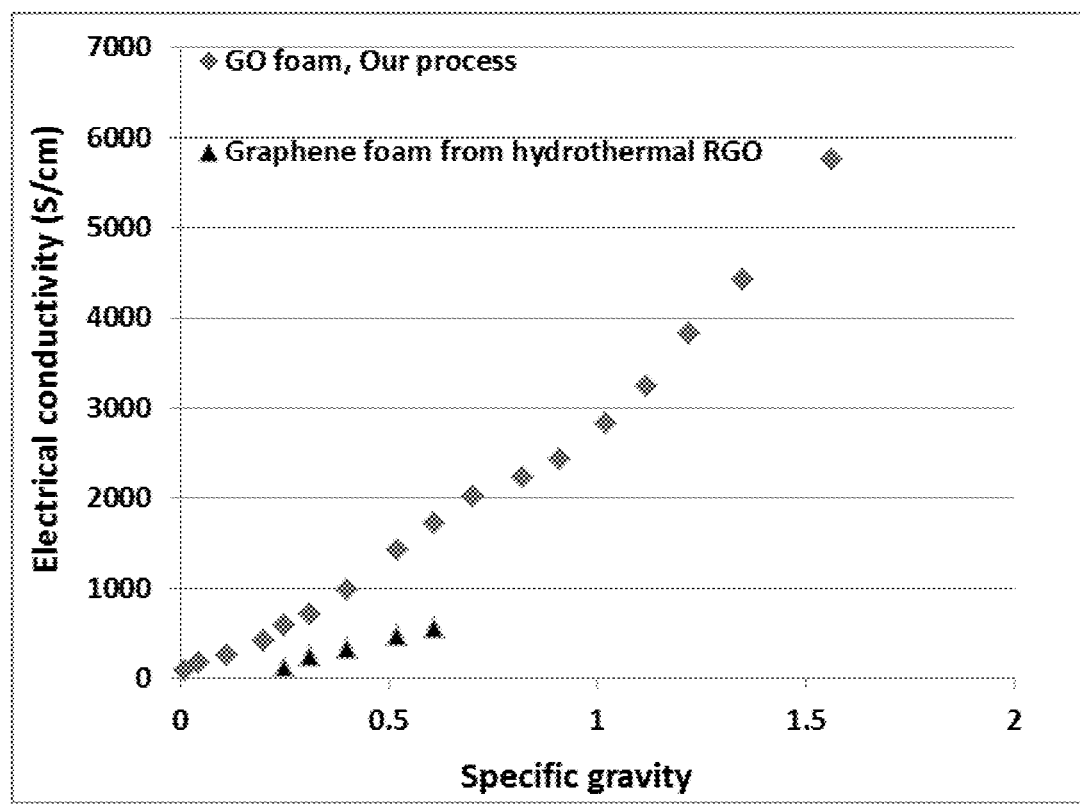
FIG. 5(C) Electrical conductivity data for the GO suspension-derived foam produced by the presently invented process and the hydrothermally reduced GO graphene foam.
Figure 6B:
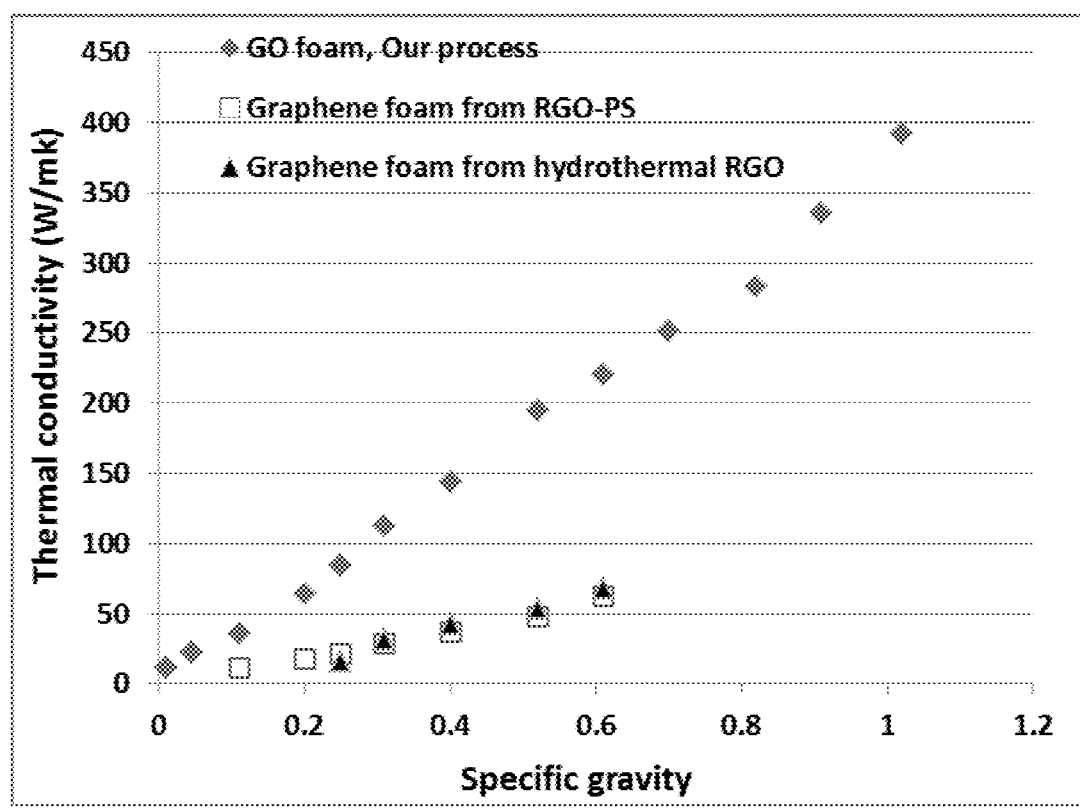
FIG. 6(B) Thermal conductivity values of the GO suspension-derived foam, sacrificial plastic bead-templated GO foam, and hydrothermally reduced GO graphene foam (vs. specific gravity values up to 1.02 g/cm³)

FIG. 5(B) and FIG. 6(B) show the thermal conductivity values of the presently invented GO suspension-derived foam, GO foam produced via sacrificial plastic bead template-assisted process, and hydrothermally reduced GO graphene foam. Most surprisingly, given the same starting GO sheets, the presently invented process produces the highest-performing graphene foams. Electrical conductivity data summarized in FIG. 5(C) are also consistent with this conclusion. These data further support the notion that, given the same amount of solid material, the presently invented GO suspension deposition (with stress-induced orientation) and subsequent heat treatments give rise to a graphene foam that is intrinsically most conducting, reflecting a highest level of graphitic crystal perfection (larger crystal dimensions, fewer grain boundaries and other defects, better crystal orientation, etc. along the pore walls).

It is of significance to point out that all the prior art processes for producing graphite foams or graphene foams appear to provide macro-porous foams having a physical density in the range from approximately 0.2-0.6 g/cm³ only with pore sizes being typically too large (e.g. from 20 to 300 µm) for most of the intended applications. In contrast, the instant invention provides processes that generate graphene foams having a density that can be as low as 0.01 g/cm³ and as high as 1.7 g/cm³. The pore sizes can be varied between mesoscaled (2-50 nm, for cushioning local volume expansion of Si nanowires) up to macroscaled (1-50 µm, for accommodating Si particles) depending upon the contents of non-carbon elements and the amount/type of blowing agent used. This level of flexibility and versatility in designing various types of graphene foams is unprecedented and un-matched by any prior art process.

Example 6: Preparation of Graphene Foams from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability.

Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 g/cm³. When a blowing agent was used (blowing agent/GF weight ratio from 0.5/1 to 0.05/1), a density from 0.02 to 0.35 g/cm³ was obtained. Typical fluorine contents are from 0.001% (HTT=2,500° C.) to 4.7% (HTT=350° C.), depending upon the final heat treatment temperature involved.

Figure 7:
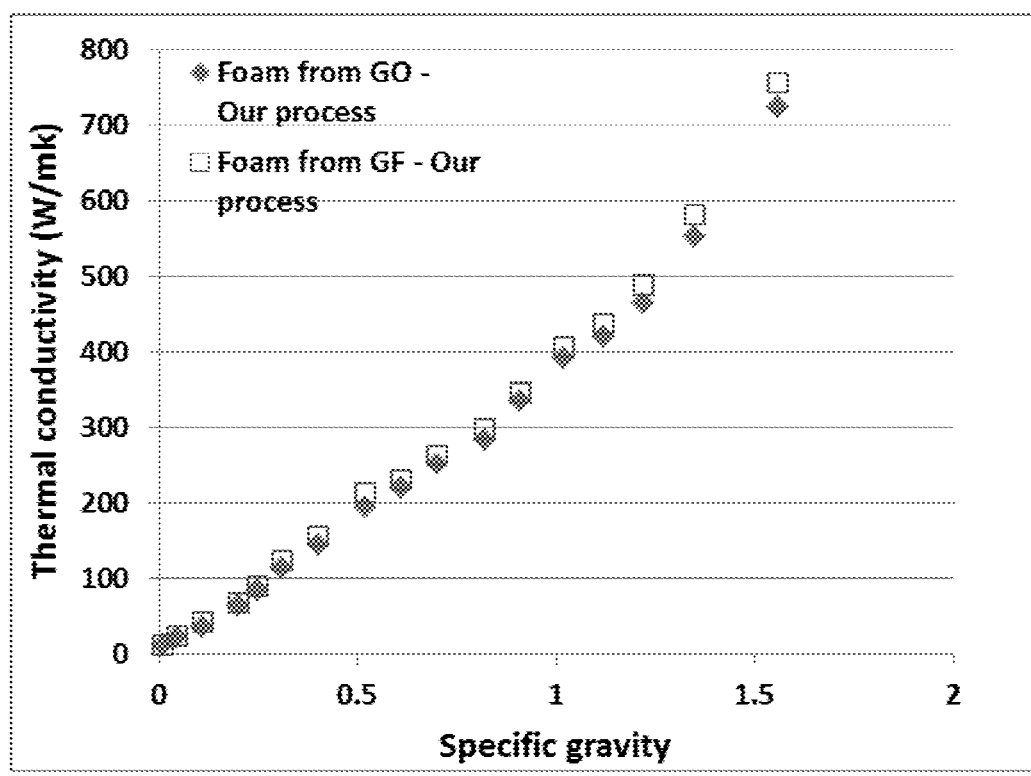
FIG. 7 Thermal conductivity values of graphene foam samples derived from GO and GF (graphene fluoride) as a function of the specific gravity.

FIG. 7 presents a comparison in thermal conductivity values of the graphene foam samples derived from GO and GF (graphene fluoride), respectively, as a function of the specific gravity. It appears that the GF foams, in comparison with GO foams, exhibit higher thermal conductivity values at comparable specific gravity values. Both deliver impressive heat-conducting capabilities, being the best among all known foamed materials.

Example 7: Preparation of Graphene Foams from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions were then cast, dried, and heat-treated initially at 200-350° C. as a first heat treatment temperature and subsequently treated at a second temperature of 1,500° C. The resulting nitrogenated graphene foams exhibit physical densities from 0.45 to 1.28 g/cm³. Typical nitrogen contents of the foams are from 0.01% (HTT=1,500° C.) to 5.3% (HTT=350° C.), depending upon the final heat treatment temperature involved.

Example 8: Characterization of Various Graphene Foams and Conventional Graphite Foam The internal structures (crystal structure and orientation) of several dried GO layers, and the heat-treated films at different stages of heat treatments were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. Upon oxidation, the resulting GO shows an X-ray diffraction peak at approximately $2\theta=12°$, which corresponds to an inter-graphene spacing ($d_{002}$) of approximately 0.7 nm. With some heat treatment at 150° C., the dried GO compact exhibits the formation of a hump centered at 22°, indicating that it has begun the process of decreasing the inter-graphene spacing due to the beginning of chemical linking and ordering processes. With a heat treatment temperature of 2,500° C. for one hour, the $d_{002}$ spacing has decreased to approximately 0.336, close to 0.3354 nm of a graphite single crystal.

With a heat treatment temperature of 2,750° C. for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e,g, highly oriented pyrolytic graphite, HOPG) is in the range from 0.2-0.5. In contrast, a graphene foam prepared with a final HTT of 2,750° C. for one hour exhibits a I(004)/I(002) ratio of 0.78 and a Mosaic spread value of 0.21, indicating a practically perfect graphene single crystal with a good degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.2-0.4 when produced using a final heat treatment temperature no less than 2,500° C.

Figure 9A:
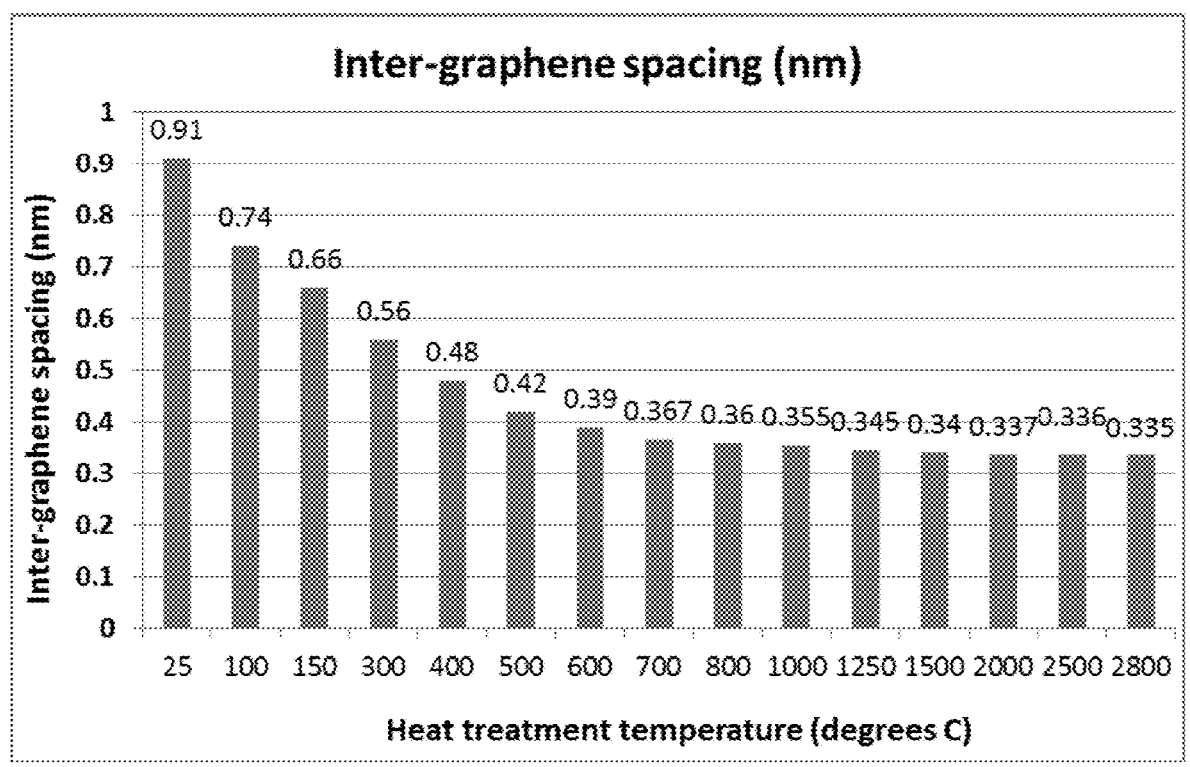
FIG. 9(A) Inter-graphene plane spacing in graphene foam walls as measured by X-ray diffraction.
Figure 9B:
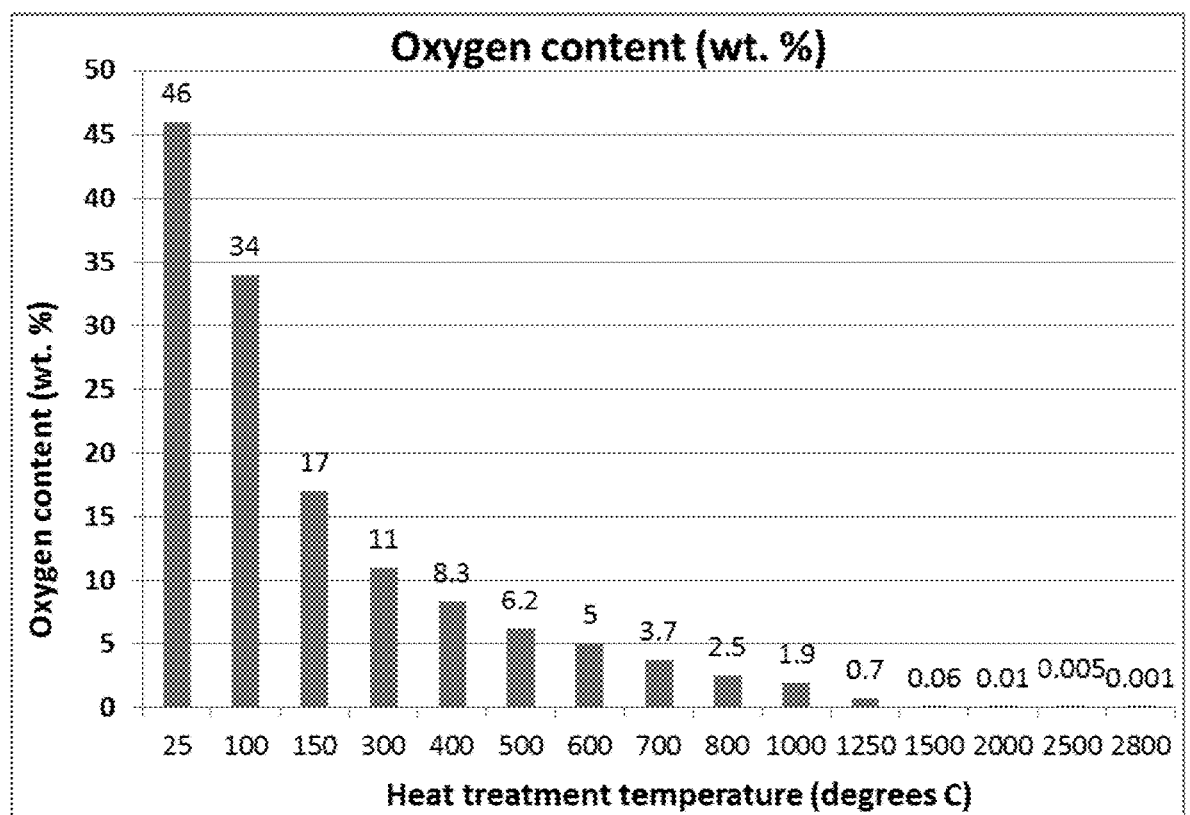
FIG. 9(B) The oxygen content in the GO suspension-derived graphene foam.

The inter-graphene spacing values of both the GO suspension-derived samples obtained by heat treating at various temperatures over a wide temperature range are summarized in FIG. 9(A). Corresponding oxygen content values in the GO suspension-derived unitary graphene layer are shown in FIG. 9(B).

It is of significance to point out that a heat treatment temperature as low as 500° C. is sufficient to bring the average inter-graphene spacing in GO sheets along the pore walls to below 0.4 nm, getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes now being larger in lateral dimensions (significantly larger than the length and width of the graphene planes in the original graphite particles). A potential chemical linking mechanism is illustrated in FIG. 4. This has given rise to exceptional thermal conductivity and electrical conductivity values.

Example 9: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 1 below are the cycle life data of a broad array of batteries featuring a presently invented anode layer of graphene foam-protected Si nanowires vs. other types of anode materials.

TABLE 1

Cycle life data of various lithium secondary (rechargeable) batteries (ρ = physical density).

| Sample ID | Protective material (type of graphene foam or conductive additive/binder) | Type & % of anode active material | Initial capacity (mAh/g) | Cycle life (No. of cycles) | Comments |
|---|---|---|---|---|---|
| SiNW-GO-3 | GO foam (HTT = 1,500° C.; ρ = 0.34-1.60 g/cm³) | 25% by wt. Si nanowires (80 nm) | 1,244 | 755-1,275 | Longest life when ρ = 0.6-1.5 g/cm³ |
| SiNW-GO-3b | GO foam (HTT = 1,500° C.; ρ = 0.34-1.60 g/cm³) | 25% by wt. Si nanowires (19 nm) emanated from graphene | 1,285 | 850-1,450 | |
| SiNW-comp | 67% graphite + 8% binder | 25% by wt. Si nanowires (78 nm) | 1,242 | 454 | No graphene |
| SiNW-GF-4 | Graphene fluoride foam (HTT = 2,120° C.) ρ = 0.66 g/cm³ | 35% Si nanowires (diameter = 90 nm) | 1,310 | 730 (with empty small pores) | Cycle life 342 (without Si-free pores) |
| SiNW-NG-5 | Nitrogenated graphene foam | 45% Si nanowires | 1,778 | 1,242 | ρ = 0.84 g/cm³ |

These data further confirms the following special features or advantages of the instant invention:
(1) If/when both Si particles and graphene sheets are coated with a catalyst metal, the resulting graphene foam contains larger numbers of much thinner Si nanowires, leading to significantly improved battery performance.
(2) The graphene foam is very effective in alleviating the anode expansion/shrinkage problems (in addition to addressing the Si expansion/shrinkage-induced pulverization issues). Graphene foam containing pores that are not occupied by an anode active material (Si-free pores) are significantly more effective in enhancing the cycle stability of a lithium-ion battery.
(3) Functionalized graphene foam (e.g. fluorinated or nitrogenated graphene) is also an effective protector for Si nanowires.

Example 11: Evaluation of Lithium-Ion Batteries Featuring Anodes Containing Si Nanowires in Pores of Graphene Foam For electrochemical testing, several types of anodes and cathodes were prepared. For instance, a layer-type of anode was prepared by simply roll-pressing the foam against a sheet of Cu foil (as an anode current collector). Some foam samples containing Si nanowires grown in situ were used as an anode electrode without using a separate Cu foil current collector.

For comparison purposes, slurry coating was also used to prepare conventional electrodes. For instance, the working electrodes were prepared by mixing 85 wt. % active material (Si nanowire-graphene, 7 wt. % acetylene black (Super-P), and 8 wt. % polyvinylidene fluoride (PVDF, 5 wt. % solid content) binder dissolved in N-methyl-2-pyrrolidinoe (NMP). After coating the slurries on Cu foil, the electrodes were dried at 120° C. in vacuum for 2 h to remove the solvent before pressing.

Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). Various anode material compositions were evaluated, including those containing a simple mixture of Si particles and graphene sheets, Si nanowires grown from Si particles with or without the help from metal-coated graphene sheets (in a simple mixture or in a presently invented graphene foam containing protected Si nanowire in pores). The cell assembly was performed in an argon-filled glove-box. The CV measurements were carried out using an electrochemical workstation at a scanning rate of 1 mV/s. The electrochemical performance of graphene-Si nanowire foam structures was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

Figure 11:
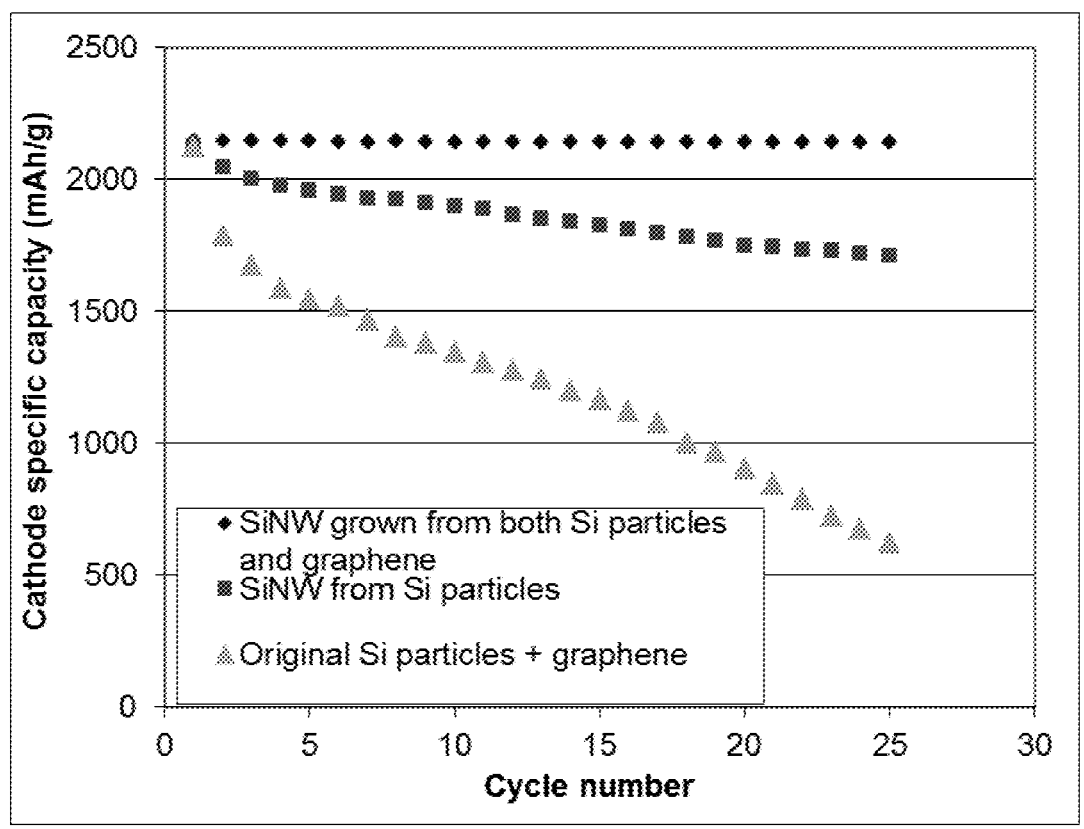
FIG. 11 Cycling test results of three lithium-ion cells: first cell containing original Si particles embedded in pores of graphene foam (no Si nanowires) as the anode active material, second cell containing Si nanowires grown from Ni metal-coated Si particles in pores of graphene foam made of un-coated graphene sheets, and third cell containing Si nanowires emanated from both Ni-coated Si particles and Ni-coated graphene sheets in a graphene foam structure.

Shown in FIG. 11 are charge/discharge cycling test results of three lithium-ion cells in terms of the anode specific capacity plotted as a function of the cycle number. The first battery cell contains an anode layer of graphene foam containing original Si particles (average diameter=3.5 μm) residing in pores (but no Si nanowires) as the anode active material. The second cell contains Si nanowires (diameter of 60-90 nm, grown from Ni metal-coated Si particles) as the anode active material residing in pores of a graphene foam made of un-coated graphene sheets. The anode of the third cell contains Si nanowires (diameter of 5-20 nm) emanated from both Ni-coated Si particles and Ni-coated graphene sheets inside pores of a graphene foam.

These results demonstrate that the foam containing Si nanowires emanated from both Ni-coated Si particles and Ni-coated graphene sheets provide the most stable cycling behavior among all lithium-ion cells. The layer of graphene foam containing Si nanowires (grown from Ni metal-coated Si particles alone; not from un-coated graphene sheets) are less effective in providing the lithium-ion cell with a stable charge/discharge cycling response. However, this response is much better than what could be achieved by an anode based on the original micron-scaled Si particles embedded in a graphene foam structure. The latter suffers from rapid capacity decay as charges and discharges are repeated. The differences are quite dramatic and unexpected.

Figure 12:
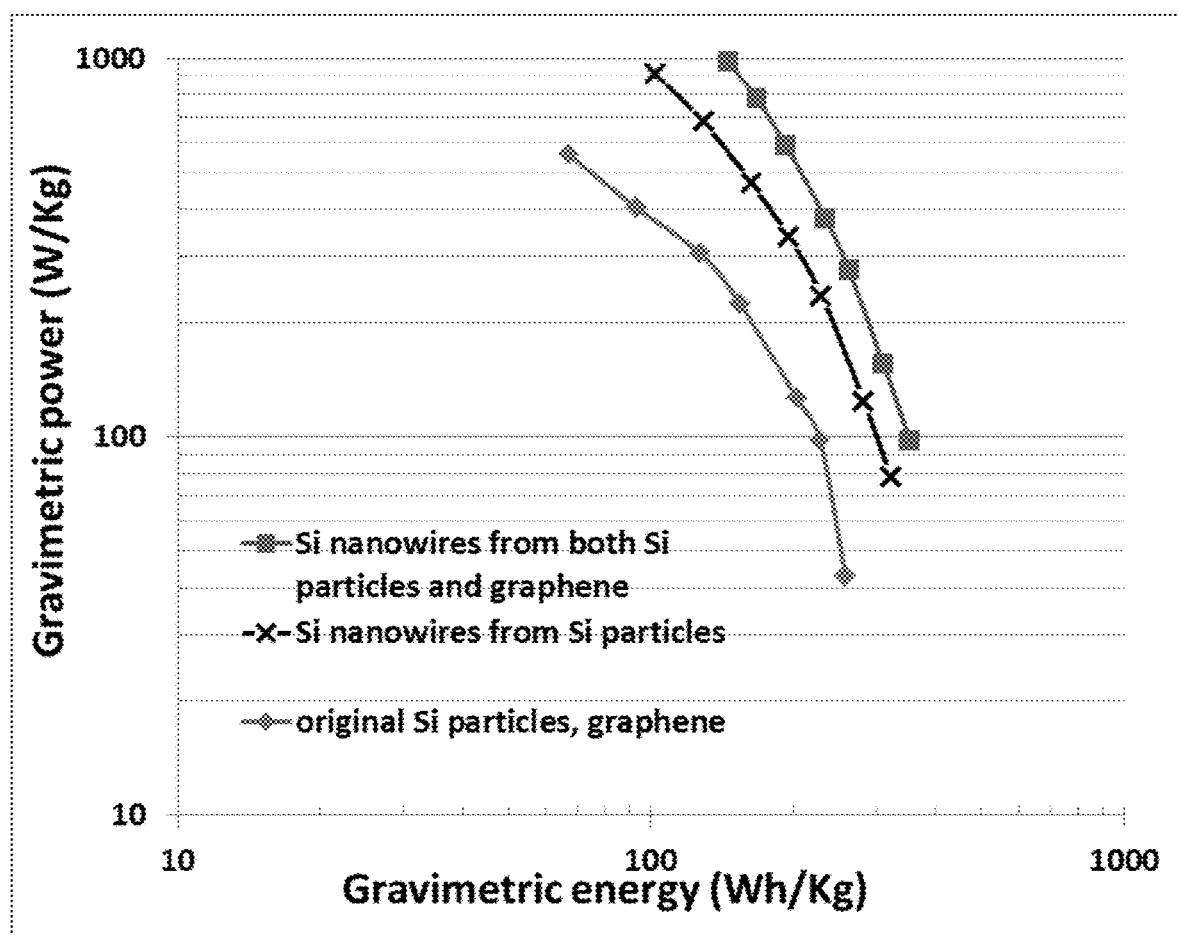
FIG. 12 Ragone plots (power density vs. energy density) of three lithium-ion cells: first cell containing an anode layer of graphene foam containing original Si particles (no Si nanowires) in pores of the foam, second cell containing Si nanowires grown from Ni metal-coated Si particles in pores of graphene foam made of un-coated graphene sheets, and third cell containing Si nanowires emanated from both Ni-coated Si particles and Ni-coated graphene sheets in a graphene foam.

FIG. 12 shows representative Ragone plots of three lithium-ion cells: first cell containing original Si particles and graphene sheets (no Si nanowires) as the anode active material in a graphene foam structure, second cell containing Si nanowires grown from Ni metal-coated Si particles and un-coated graphene sheets in a graphene foam structure, and third cell containing Si nanowires emanated from both Ni-coated Si particles and Ni-coated graphene sheets in a graphene foam structure. The cell featuring an anode active material containing a massive amount of small-diameter Si nanowires emanated from both metal-coated Si particles and metal-coated graphene sheets (pore walls) in a graphene foam exhibits both highest energy density and highest power density. The cell energy density of 352 Wh/kg is significantly higher than the typically 150-220 Wh/kg of prior art lithium-ion batteries. The power density of 998 W/kg is also much higher than the typically 300-500 W/kg. These are surprising and of high utility value.

Figure 13:
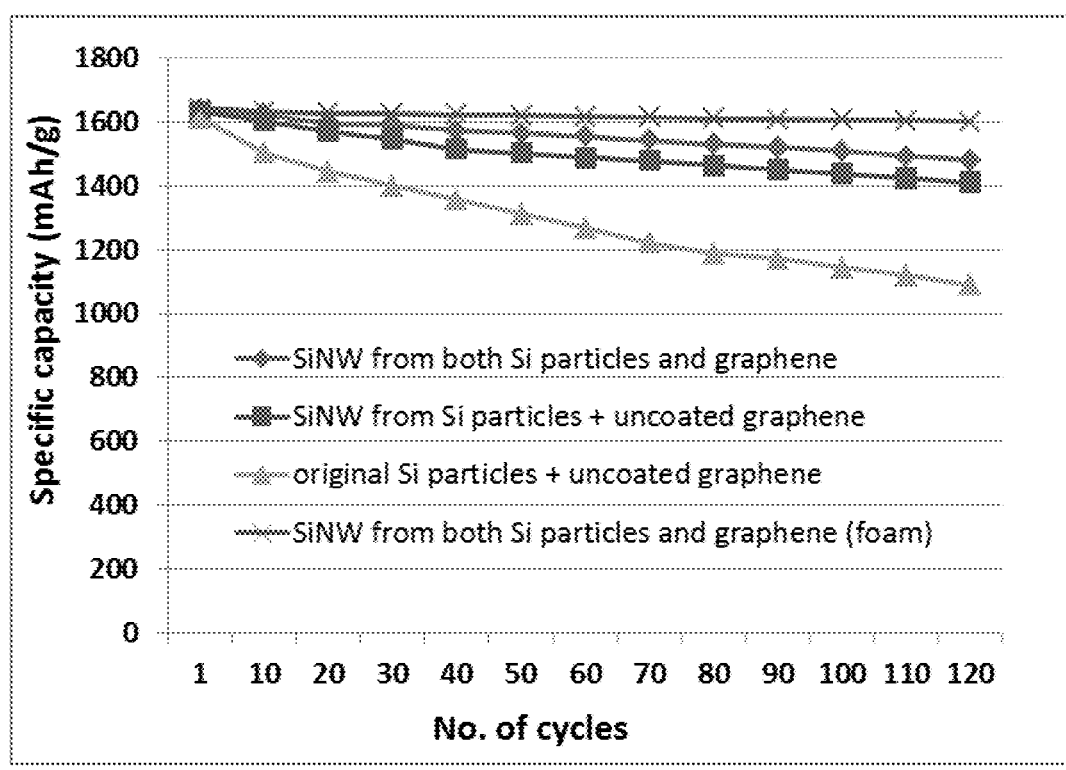
FIG. 13 Cycling test results of four lithium-ion cells: first cell containing original Si particles and graphene sheets simply mixed together (no Si nanowires) as the anode active material, second cell containing a simple mixture of Si nanowires grown from Ni/Al metal-coated Si particles and un-coated graphene sheets, third cell containing Si nanowires emanated from both Ni/Al-coated Si particles and Ni/Al-coated graphene sheets simply mixed together, and fourth cell containing Si nanowires emanated from both Ni/Al-coated Si particles and Ni/Al-coated graphene sheets in a graphene foam layer.

FIG. 13 shows the cycling test results of four lithium-ion cells: first cell containing a simple mixture of original Si particles and graphene sheets (no Si nanowires) as the anode active material, second cell containing a simple mixture of Si nanowires grown from Ni/Al metal-coated Si particles and un-coated graphene sheets (Si nanowires grown in situ after mixing), third cell containing a simple mixture of Si nanowires emanated from both Ni/Al-coated Si particles and Ni/Al-coated graphene sheets, and fourth cell containing Si nanowires emanated from both Ni/Al-coated Si particles and Ni/Al-coated graphene sheets in a graphene foam (Si nanowires grown in situ after foam formation). These results demonstrate that the approach of growing Si nanowires in pores of a graphene foam surprisingly provides the most stable cycling behavior for a lithium-ion battery.

In conclusion, we have successfully developed an absolutely new, novel, unexpected, and patently distinct class of anode electrode for the lithium-ion battery. This anode contains highly conducting graphene foam-protected Si nanowires that are formed in situ inside pores of the graphene foam structure. The chemical composition (% of oxygen, fluorine, and other non-carbon elements), structure (crystal perfection, grain size, defect population, etc), crystal orientation, morphology, process of production, and properties of this new class of graphene foam, containing Si nanowires in the pores, are fundamentally different and patently distinct from all prior art anode structures. The presently invented graphene foam structures impart higher thermal conductivity, higher electrical conductivity, minimal electrode volume changes, more effective anode-protecting capability, improved cycle stability, and significantly higher energy storage capability to the high-capacity anodes as compared to any prior art anode structures.

We claim:

1. An anode for a lithium battery comprising a graphene foam structure composed of multiple pores and pore walls and Si nanowires residing in said pores, wherein said Si nanowires are formed in situ inside said pores, wherein said pore walls comprise a 3D network of interconnected graphene planes or stacked graphene planes having an inter-plane spacing $d_{002}$ from 0.3354 nm to 0.40 nm as measured by X-ray diffraction and wherein said Si nanowires have a diameter from 2 nm to 100 nm and a length-to-diameter aspect ratio of at least 5 and said Si nanowires are in an amount from 0.5% to 99% by weight based on the total weight of said graphene foam and said Si nanowires combined, wherein at least some of said Si nanowires are chemically bonded to said pore walls at one of two ends of each said Si nanowire.

2. The anode of claim 1, wherein said pore walls comprise a pristine graphene material and said graphene foam structure has a density from 0.5 to 1.7 $g/cm^3$ or said pores have a pore size from 2 nm to 100 nm.

3. The anode of claim 1, wherein said pore walls comprise a non-pristine graphene material.

4. The anode of claim 3, wherein said non-pristine graphene material contains a content of non-carbon elements from 0.01% to 2.0% by weight.

5. The anode of claim 4, wherein said non-carbon elements include an element selected from the group consisting of oxygen, fluorine, chlorine, bromine, iodine, nitrogen, hydrogen, and boron.

6. The anode of claim 1, wherein said graphene foam structure, when measured alone without Si, has a specific surface area from 200 to 2,000 $m^2/g$ or a density from 0.1 to 1.5 $g/cm^3$.

7. The anode of claim 1, wherein said graphene foam structure, when measured alone without Si, has an oxygen content or non-carbon content less than 1% by weight, and said pore walls have an inter-graphene spacing less than 0.35 nm, a thermal conductivity from 250-450 W/mK per unit of specific gravity, and/or an electrical conductivity no less than 2,500-4,000 S/cm per unit of specific gravity.

8. The anode of claim 1, wherein said pore walls contain stacked graphene planes having an inter-graphene spacing less than 0.337 nm and a mosaic spread value less than 1.0.

9. The anode of claim 1, wherein said graphene foam structure exhibits a degree of graphitization no less than 80% and/or a mosaic spread value less than 0.4.

10. The anode of claim 1, wherein said pore walls contain a 3D network of interconnected graphene planes.

11. The anode of claim 1, wherein said graphene foam structure comprises two pore size ranges, one from 2 nm to 50 nm for cushioning volume expansion of Si nanowires and the other from 200 nm to 20 μm to accommodate Si nanowires.

12. A lithium battery comprising the anode as defined in claim 1, a cathode or positive electrode, and an electrolyte in ionic contact with said anode and said cathode.

13. The lithium battery of claim 12, further comprising a cathode current collector in electronic contact with said cathode or further comprising a separate anode current collector in electronic contact with said anode.

14. The lithium battery of claim 12, wherein said graphene foam operates as an anode current collector to collect electrons from said Si nanowires during a charge of said lithium battery, which contains no separate or additional current collector.

15. An anode for a lithium battery comprising a graphene foam structure composed of multiple pores and pore walls and Si nanowires residing in said pores, wherein said pore walls comprise a 3D network of interconnected graphene planes or stacked graphene planes having an inter-plane spacing $d_{002}$ from 0.3354 nm to 0.40 nm as measured by X-ray diffraction and wherein said Si nanowires have a diameter from 2 nm to 100 nm and a length-to-diameter aspect ratio of at least 5 and said Si nanowires are in an amount from 0.5% to 99% by weight based on the total weight of said graphene foam and said Si nanowires combined, wherein said anode further comprises a catalyst metal selected from the group consisting of Cu, Mn, Fe, Ag, Au, Pt, Pd, and combinations thereof, which is attached to said Si nanowires.

16. The anode of claim 15, wherein said pore walls comprise a non-pristine graphene material.

17. The anode of claim 15, wherein said non-pristine graphene material contains a content of non-carbon elements from 0.01% to 2.0% by weight.

18. The anode of claim 17, wherein said non-carbon elements include an element selected from the group consisting of oxygen, fluorine, chlorine, bromine, iodine, nitrogen, hydrogen, and boron.

19. The anode of claim 15, wherein said graphene foam structure, when measured alone without Si, has a specific surface area from 200 to 2,000 $m^2/g$ or a density from 0.1 to 1.5 $g/cm^3$.

20. The anode of claim 15, wherein said graphene foam structure, when measured alone without Si, has an oxygen content or non-carbon content less than 1% by weight, and said pore walls have an inter-graphene spacing less than 0.35 nm, a thermal conductivity from 250-450 W/mK per unit of specific gravity, and/or an electrical conductivity no less than 2,500-4,000 S/cm per unit of specific gravity.

* * * * *